(12) United States Patent
Matsuura et al.

(10) Patent No.: US 7,023,926 B2
(45) Date of Patent: Apr. 4, 2006

(54) STREAM CONVERTING APPARATUS THAT CONVERTS DATA STREAM OF FIRST FORMAT POSSIBLY CONTAINING ERROR INTO CORRECT DATA STREAM OF SECOND FORMAT

(75) Inventors: Yoshinori Matsuura, Hyogo (JP); Hiroshi Segawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 730 days.

(21) Appl. No.: 10/128,564

(22) Filed: Apr. 24, 2002

(65) Prior Publication Data

US 2002/0181600 A1 Dec. 5, 2002

(30) Foreign Application Priority Data

May 31, 2001 (JP) .............................. 2001-164227

(51) Int. Cl.
*H04N 7/12* (2006.01)
(52) U.S. Cl. .................................. 375/240.27
(58) Field of Classification Search ................ 348/423, 348/467, 461, 469, 487, 462; 370/211, 352, 370/359, 401, 466, 249; 375/240.26, 240.27, 375/240.12, 240.24, 240.16; 386/46, 124, 386/125, 105
See application file for complete search history.

(56) References Cited

U.S. PATENT DOCUMENTS 6,275,507 B1 * 8/2001 Anderson et al. ............ 370/487
6,738,559 B1 * 5/2004 Yoo et al. ...................... 386/46
6,804,455 B1 * 10/2004 Yoo et al. ...................... 386/95

OTHER PUBLICATIONS

"Polling-Based Real-Time Software for MPEG2 System Protocol LSIs", Naganuma et al., IEICE Trans. Electron., vol. E81-C, No. 5, pp. 695-701, May 1998.

* cited by examiner

*Primary Examiner*—Vu Le
*Assistant Examiner*—Behrooz Senfi
(74) *Attorney, Agent, or Firm*—McDermott Will & Emery LLP

(57) ABSTRACT

The stream converting apparatus includes a stream extracting circuit that extracts a second level data stream from a first format data stream, an error detecting circuit that detects an error included in the second level data stream output from the stream extracting circuit, a data correcting circuit that corrects the detected error to generate a proper-form second level data stream, and a multiplexer that multiplexes the corrected second level data stream to generate a second format data stream.

9 Claims, 20 Drawing Sheets

M/N SCHEME

STREAM CONVERTING APPARATUS THAT CONVERTS DATA STREAM OF FIRST FORMAT POSSIBLY CONTAINING ERROR INTO CORRECT DATA STREAM OF SECOND FORMAT

BACKGROUND OF THE INVENTION

1. Field of the Invention

The present invention relates to an apparatus for converting a format of a data stream of, e.g., MPEG (Moving Picture Experts Group, the international standards for compression of hybrid media moving pictures) to another format. More particularly, the present invention relates to a stream converting apparatus capable of generating proper converted data even if an error is included in a received data stream.

2. Description of the Background Art

The MPEG international standard scheme is for compressing video and audio digital data. The MPEG scheme has been used for digital television broadcasting and DVD (Digital Video Discs), and is expected to become further widespread.

MPEG defines two kinds of video and audio multiplexed formats (AV (Audio and Visual) multiplexed formats): a TS (Transport Stream) format as the first format; and a PS (Program Stream) format as the second format. The PS format generates an ES (Elementary Stream) (a data train) of a first level from an arbitrary number of individually coded video, audio and other information, and further packetizes the ES to generate a PES (Packetized Elementary Stream). The PES is then multiplexed to form an integrated stream as a set of program. The header of each packet includes system clock information for reproduction. The TS format combines a plurality of such programs into a stream.

The PS format is primarily used for storage media like DVD, whereas the TS format is used for broadcasting and communication. Thus, for recording a program of the digital television broadcasting on a DVD, it is necessary to convert the stream format from TS to PS. The stream converting apparatus performs such conversion of the stream formats.

When a stream is being transmitted over a long distance in broadcasting or communication, a channel error may occur, resulting in an incomplete TS. Since a conventional stream converting apparatus presumes that the input TS is always complete, it converts the incomplete TS to a PS without alteration. This means that the PS generated is not always correct.

In the standards for DVD equipment (hereinafter, referred to as "DVD standards") established as a PS application product, requirements for information for retrieval, information for designating a unit of processing and others have been added to those of the MPEG2 PS standards. An incorrect PS does not satisfy the DVD standards, hindering proper DVD recording.

FIG. 1 is a block diagram of a conventional stream converting apparatus. Referring to FIG. 1, the stream converting apparatus receives stream data (TS) from an input terminal 40, converts it to a PS, and outputs the PS from an output terminal 50. The apparatus includes: a TS separator 330 that receives the stream data from input terminal 40 and separates the TS into a video PES ("V-PES"), an audio PES ("A-PES") and system clock information for output; and a PS multiplexer 332 connected to TS separator 330 that receives therefrom the V-PES, A-PES and system clock information and multiplexes them to a PS for output to output terminal 50.

The stream data input from input terminal 40 is supplied to TS separator 330, and separated to and outputted as the V-PES, A-PES and system clock information. PS multiplexer 332 multiplexes the V-PES, A-PES and system clock information into a PS, and outputs it to output terminal 50.

FIG. 2 shows another example of the conventional stream converting apparatus. Referring to FIG. 2, the stream converting apparatus receives a TS from input terminal 40, converts it to a PS and outputs the PS from output terminal 50. The apparatus includes: a TS decoder 240 that receives the stream data from input terminal 40, separates the TS into a V-ES (Elementary Stream), video (V) header parameters (PTS, DTS and others) included in a V-PES header, an A-ES, audio (A) header parameters included in an A-PES header and system clock information for output; and a PS encoder 242 connected to TS decoder 240 that receives therefrom the V-ES, V header parameters, A-ES, A header parameters and system clock information, and multiplexes them into a PS for output to output terminal 50.

Referring to FIG. 3, TS decoder 240 includes: a TS separator 350 that receives the TS from input terminal 40 and separates it into system clock information, V-PES and A-PES for output; a video PES separator 352 that separates the V-PES output from TS separator 350 into a V-ES and video header parameters for output; and an audio PES separator 354 that separates the A-PES output from TS separator 350 into an A-ES and audio header parameters for output.

Referring to FIG. 4, PS encoder 242 includes: a video PES multiplexer 360 that receives the V-ES and video header parameters from video PES separator 352 and multiplexes them into a V-PES for output; an audio PES multiplexer 362 that receives the A-ES and audio header parameters from audio PES separator 354 and multiplexes them into an A-PES for output; and a PS multiplexer 364 connected to video PES multiplexer 360, audio PES multiplexer 362 and TS separator 350 that multiplexes the V-PES output from video PES multiplexer 360 and the A-PES output from audio PES multiplexer 362 into a PS employing the system clock information provided from TS separator 350.

The stream data input from input terminal 40 is provided to TS separator 350, where it is separated into the V-ES, A-ES and system clock information and outputted therefrom. Video PES separator 352 separates the V-PES into the V-ES and video header parameters and provides them to video PES multiplexer 360. Similarly, audio PES separator 354 separates the A-PES into the A-ES and audio header parameters, and provides them to audio PES multiplexer 362.

Video PES multiplexer 360 generates the V-PES using the V-ES and video header parameters received, and provides the generated V-PES to PS multiplexer 364. Similarly, audio PES multiplexer 362 generates the A-PES using the A-ES and audio header parameter received, and provides the generated A-PES to PS multiplexer 364. PS multiplexer 364 multiplexes the V-PES supplied from video PES multiplexer 360 and the A-PES supplied from audio PES multiplexer 360 into the PS using the system clock information supplied from TS separator 350, and outputs the PS.

The TS being input may include temporary corrupted data due to a channel error. Data corruption may last for such a long period of time that the TS separator may not be able to recognize the TS packets.

In the case of the temporary corruption, the TS separator obtains a PES from the TS with the corrupted data included therein. The PES containing the corrupted data is supplied to the PS multiplexer, where it is multiplexed to a PS. The resultant PS is thus incorrect.

If the data corruption lasts for a long period of time, there occurs a period where the TS separator cannot recognize the input as the TS and thus suspends the TS separating and PES outputting processes. In such a case, the audio and video PES data thus suspended often include the clock information for reproduction different from each other. Thereafter, even if the data corruption is over, when the data at the time of suspension are multiplexed by the PS multiplexer into a PS, the resultant PS will not allow synchronization of the video and audio. Thus, reproduction of such a PS with a PS decoder (not shown) would lead to disruption in buffering, hindering proper reproduction of the video and others.

Further, the DVD standards pose the following problem. The DVD standards define approximately 15 frames as a unit of processing, and the exact number of frames in the unit of processing and the number of PS packets within the first frame should be extracted as retrieval information. If the data corruption, or the period during which the data is missing, lasts for a long period of time, the retrieval information cannot be generated correctly.

SUMMARY OF THE INVENTION

In view of the foregoing, an object of the present invention is to provide a stream converting apparatus capable of correctly generating a converted stream, e.g., PS, even if an input stream, e.g., TS, is incomplete.

Another object of the present invention is to provide a stream converting apparatus capable of correctly generating a converted stream, even if a TS being input is incomplete.

If the data amount after correction considerably varies from the original data amount, it will lead to disruption in buffering. Accordingly, yet another object of the present invention is to provide a stream converting apparatus capable of correctly generating a converted stream without largely changing the data amount associated with correction, even if a TS being input is incomplete.

In general, the code amount decreases when converting a TS to a PS, and thus, it increases when re-converting the PS to the TS. When the capacity of a recording medium is limited, there arise a case where the re-converted data cannot be written therein.

Accordingly, a further object of the present invention is to provide a stream converting apparatus capable of preventing such a problem that reconverted data cannot be written into a recording medium with a limited capacity.

According to an aspect of the present invention, the stream converting apparatus converts a first format data stream into a second format data stream, wherein the first format data stream is obtained by packetizing a first level data stream to generate a second level data stream, and further multiplexing the second level data stream. The apparatus includes: a stream extracting circuit extracting the second level data stream from the first format data stream; an error detecting circuit connected to an output of the stream extracting circuit and detecting an error included in the second level data stream output from the stream extracting circuit; a data correcting circuit connected to the error detecting circuit and correcting the error detected by the error detecting circuit to generate a proper-form second level data stream; and a multiplexer connected to an output of the data correcting circuit and multiplexing the second level data stream corrected by the data correcting circuit to generate the second format data stream.

The apparatus corrects the error within the first format data stream before generating the second format data stream. Thus, compared to the case where the second format data stream is generated from the data stream including the error, the second format data stream obtained becomes more accurate.

Preferably, the second level data stream is arranged in packets including packet headers, and the packet header includes system clock information associated with data. The error detecting circuit includes: a separating circuit separating and extracting the second level data stream from the first format data stream; and a clock error detecting circuit connected to an output of the separating circuit and detecting the error included in the second level data stream from a transition of the system clock information in the packet header of each packet in the second level data stream extracted by the separating circuit.

The error of destruction or missing of data can be detected from the transition of the clock information and corrected. Thus, compared to the case where the second format data stream is generated from the data stream with the error of destruction or missing of data included therein, the second format data stream obtained becomes more accurate.

More preferably, the clock error detecting circuit includes a circuit connected to an output of the separating circuit and detecting that the system clock information included in the packet header of each packet in the second level data stream does not make a transition at a predetermined constant interval.

An error is detected when it is found that the system clock information does not make a transition at a predetermined constant interval as desired. Thus, the error or the state that the system clock information has been garbled due to destruction of data or the like can be detected. Accordingly, compared to the case where the second format data stream is generated from the data stream with the error or destruction of data included therein, the second format data stream obtained becomes more accurate.

More preferably, the data correcting circuit includes: a packet type determination circuit determining the packet type of each packet of the second level data stream determined to include an error by the clock error detecting circuit; a system clock information estimating circuit estimating the system clock information associated with each packet of the second level data stream determined to include the error; and a dummy data inserting circuit generating and inserting into the data stream a dummy packet including dummy data having the system clock information estimated by the system clock information estimating circuit and of the packet type determined by the packet type determination circuit.

When data is destructed or missing, the dummy data is inserted into the data stream. The dummy data is of the estimated packet type and has the estimated system clock information. Thus, compared to the case where the second format data stream is generated from the data stream with the error included therein, the second format data stream obtained becomes more accurate.

According to another aspect of the present invention, the method for converting a first format data stream into a second format data stream converts the first format data stream, obtained by packetizing a first level data stream to generate a second level data stream and further multiplexing the second level data stream, to the second format data stream. The method includes: the step of extracting the second level data stream from the first format data stream;

the step of detecting an error included in the extracted second level data stream; the step of correcting the error detected in the step of detecting the error to generate a proper-form second level data stream; and the step of multiplexing the second level data stream generated in the step of generating the proper-form second level data stream.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 5:
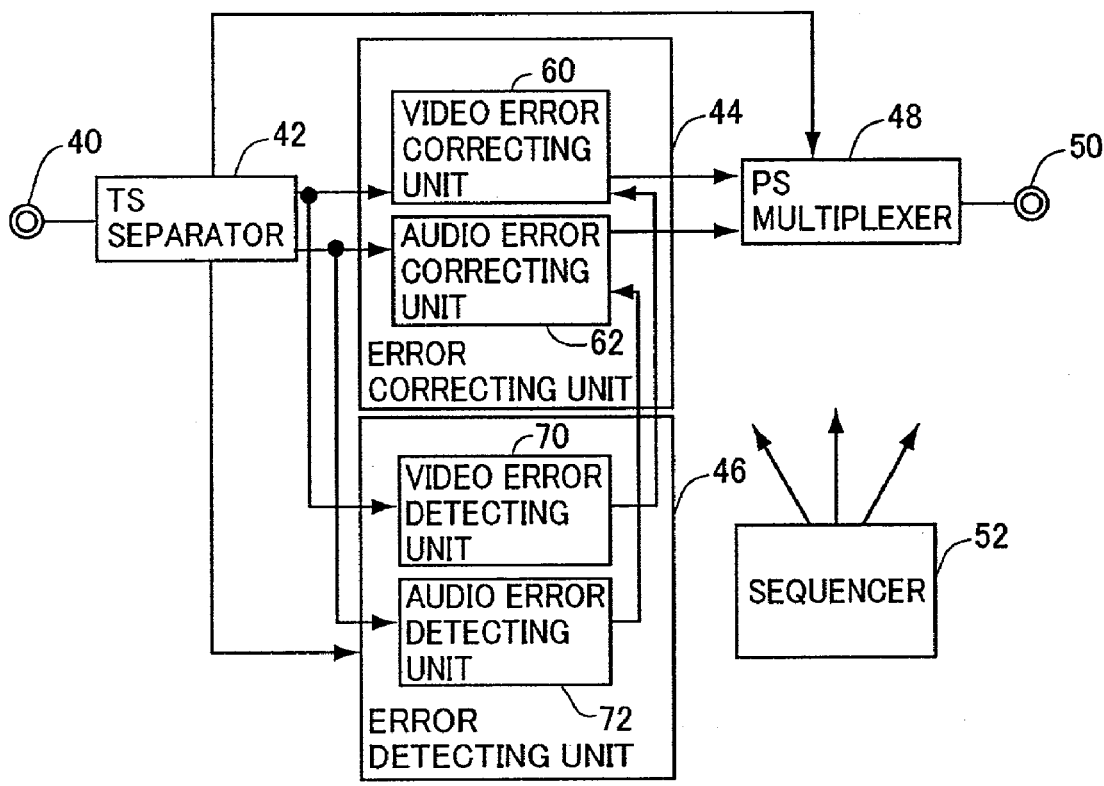
FIG. 5 is a block diagram of the stream converting apparatus according to a first embodiment of the present invention.

Referring to FIG. 5, the stream converting apparatus according to the first embodiment of the present invention includes: a TS separator 42 that receives a TS from an input terminal 40, separates the TS into V-PES, A-PES and system clock information for output, and further detects whether there is an error in a sync byte being synchronization information within the TS to output sync byte error information; an error detecting unit 46 that receives the V-PES, A-PES and sync byte error information output from TS separator 42, and determines whether there are errors in the V-PES and in the A-PES, based on the sync byte error information as well as transitions of PTS (Presentation Time Stamps) being system clock information for reproduction included within the V-PES and A-PES, respectively, to output their error information; an error correcting unit 44 that receives the V-PES and A-PES from TS separator 42 and the error information of the V-PES and A-PES from error detecting unit 46, and, when there are errors in the V-PES and A-PES, corrects them into proper formats for output; a PS multiplexer 48 that multiplexes the error-corrected V-PES and A-PES output from error correcting unit 44 using the system clock information received from TS separator 42 for output via an output terminal 50; and a sequencer 52 for control of operations of TS separator 42, error correcting unit 44, error detecting unit 46 and PS multiplexer 48.

In the MPEG scheme, a TS packet consists of 188 bytes, which includes sync byte "47" at its head as the synchronization information. Thus, it can be determined that there is no sync byte error if "47" appears at every 188 bytes in the TS; otherwise, it is determined that there is a sync byte error.

Error correcting unit 44 includes a video error correcting unit 60 for correcting an error associated with V-PES, and an audio error correcting unit 62 for correcting an error associated with A-PES.

Error detecting unit 46 includes a video error detecting unit 70 for detecting the error associated with V-PES to output an error detection signal to video error correcting unit 60, and an audio error detecting unit 72 for detecting the error associated with A-PES to output an error detection signal to audio error correcting unit 52. Both error detecting units 70 and 72 first detect TS errors according to the transitions of the PTS values within the PES headers, and then separate the errors into corrupted data and missing of data based on the sync byte error information. Error correcting units 60 and 62 can correct data according to the error types.

Hereinafter, the error associated with V-PES, and hence video error detecting unit 70 and video error correcting unit 60 will be described. Although the error associated with A-PES is not described, it will be apparent to a person skilled in the art that the audio error can be detected and corrected in the same manner and with the same concept as the video error.

Figure 6:
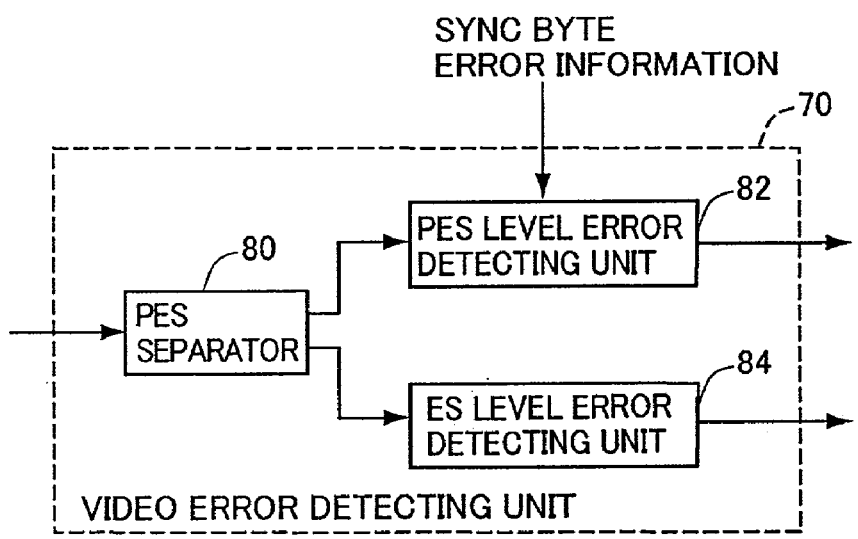
FIG. 6 is a block diagram of a video error detecting unit of the stream converting apparatus of the first embodiment.

Referring to FIG. 6, video error detecting unit 70 includes: a PES separator 80 that separates the V-PES into a PES header and an ES of a lower level; a PES level error detecting unit 82 that receives the PES header from PES separator 80 and the sync byte error information from TS separator 42 and detects an error of the V-PES at the PES level, to output a PES level error signal to video error correcting unit 60; and an ES level error detecting unit 84 that receives the ES from PES separator 80 and detects an error at the ES level based on the content of the ES, to output an ES level error signal to video error correcting unit 80.

Figure 7:
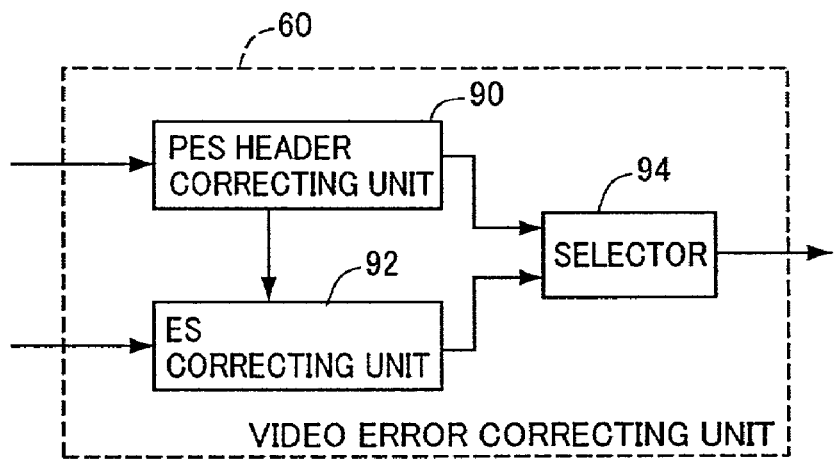
FIG. 7 is a block diagram of a video error correcting unit of the stream converting apparatus of the first embodiment.

Referring to FIG. 7, video error correcting unit 60 includes: a PES header correcting unit 90 that makes a correction of the PES header based on the error information from PES level error detecting unit 82; an ES correcting unit 92 that makes a correction at the ES level based on the error information from ES level error detecting unit 84 and picture type information provided from PES header correcting unit 90; and a selector 94 that selects one of the outputs of units 90 and 92.

Figure 8:
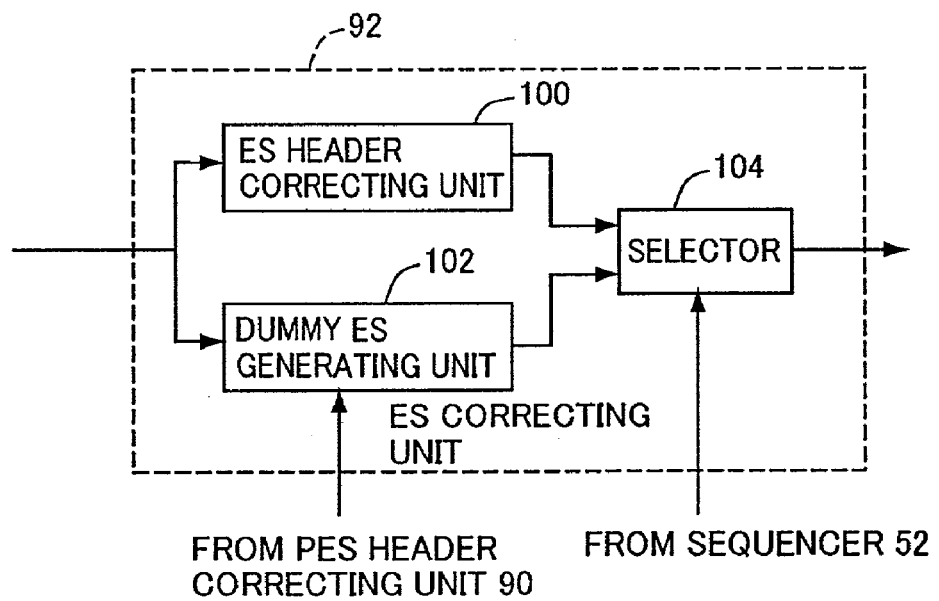
FIG. 8 is a block diagram of the error information ES correcting unit shown in FIG. 7.

Referring to FIG. 8, ES correcting unit 92 includes: an ES header correcting unit 100 that makes a correction of an ES header; a dummy ES generating unit 102 that generates and outputs a dummy ES based on the picture type information from PES correcting unit 90; and a selector 104 that selects and outputs, under the control of sequencer 52, either the header-corrected ES output from ES header correcting unit 100 or the dummy ES output from dummy ES generating unit 102.

Figure 9:
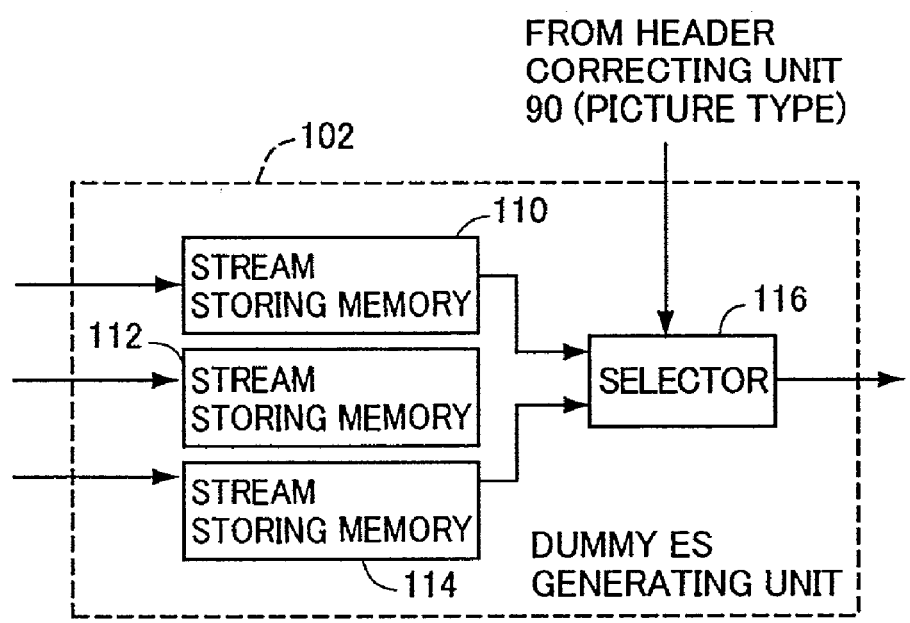
FIG. 9 is a block diagram of the dummy ES generating unit shown in FIG. 8.

Referring to FIG. 9, dummy ES generating unit 102 includes: three stream storing memories 110, 112 and 114 that store three kinds of picture data, respectively; and a selector 116 that selects and outputs one of the outputs of stream storing memories 110, 112 and 114 based on the picture type information provided from PES header correcting unit 90. In the apparatus of the present embodiment, stream storing memories 110, 112 and 114 store, in advance, dummy data of I, P and B type pictures, respectively, that constitute the GOP (Group Of Pictures) of MPEG. As the dummy data, image information of black, gray and others may be stored to reduce the amount of information. Alternatively, a skip code (indicating that, as macro block data of a current frame, the macro block data in the preceding frame located at the same position is employed) may be stored.

Figure 10:
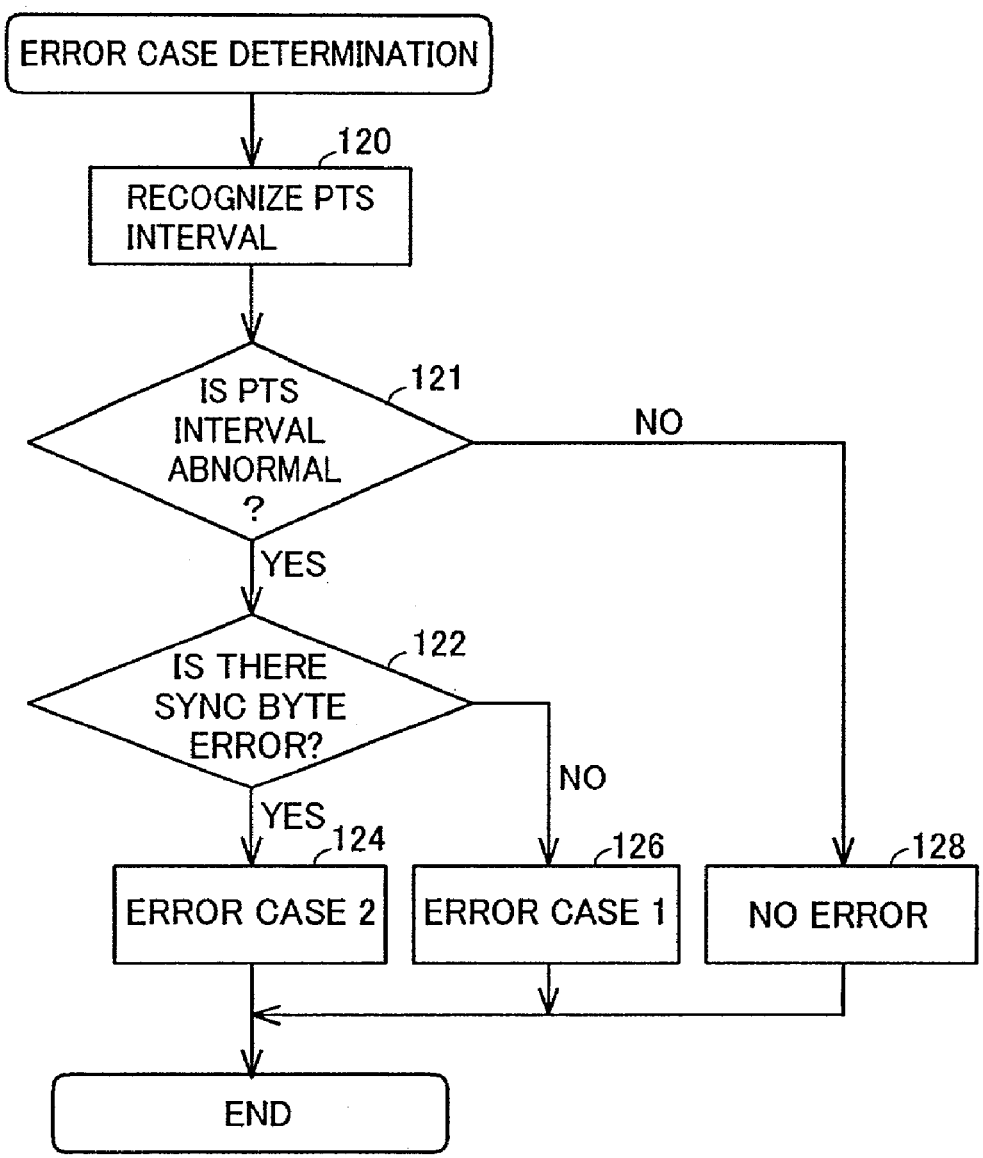
FIG. 10 is a flow chart of the process performed by the PES level error detecting unit shown in FIG. 6.

The stream converting apparatus with such a configuration operates according to the control of sequencer 52 as follows. Referring to FIG. 10, an error of the TS is detected by PES level error detecting unit 82 shown in FIG. 6. Specifically, a normal interval of the PTS values included in the PES header received is first recognized (120). In the case of a V-PES complying with the NTSC (National Television System Committee) scheme, the PTS values should normally make transitions at intervals of approximately 3003 SCR (System Clock Reference: a unit of 90 KHz).

It is then determined whether the recognized interval of the PTS values exhibits such a normal value (121). This determination is made taking fluctuation during broadcasting and multiplexing into consideration, and it is determined normal if the interval of the PTS values increases by 3003+α (for fluctuation) for each picture.

If the interval of the PTS values is determined abnormal, the sync byte error information provided from TS separator 42 is examined (122), and the error case is classified according to the examined result. Specifically, if there is no sync byte error, it is classified as the first error case (126), and a signal indicating the first error case is provided to video error correcting unit 60. If there is a sync byte error, it is classified as the second error case (124), and a corresponding signal is provided to video error correcting unit 60.

Figure 11:
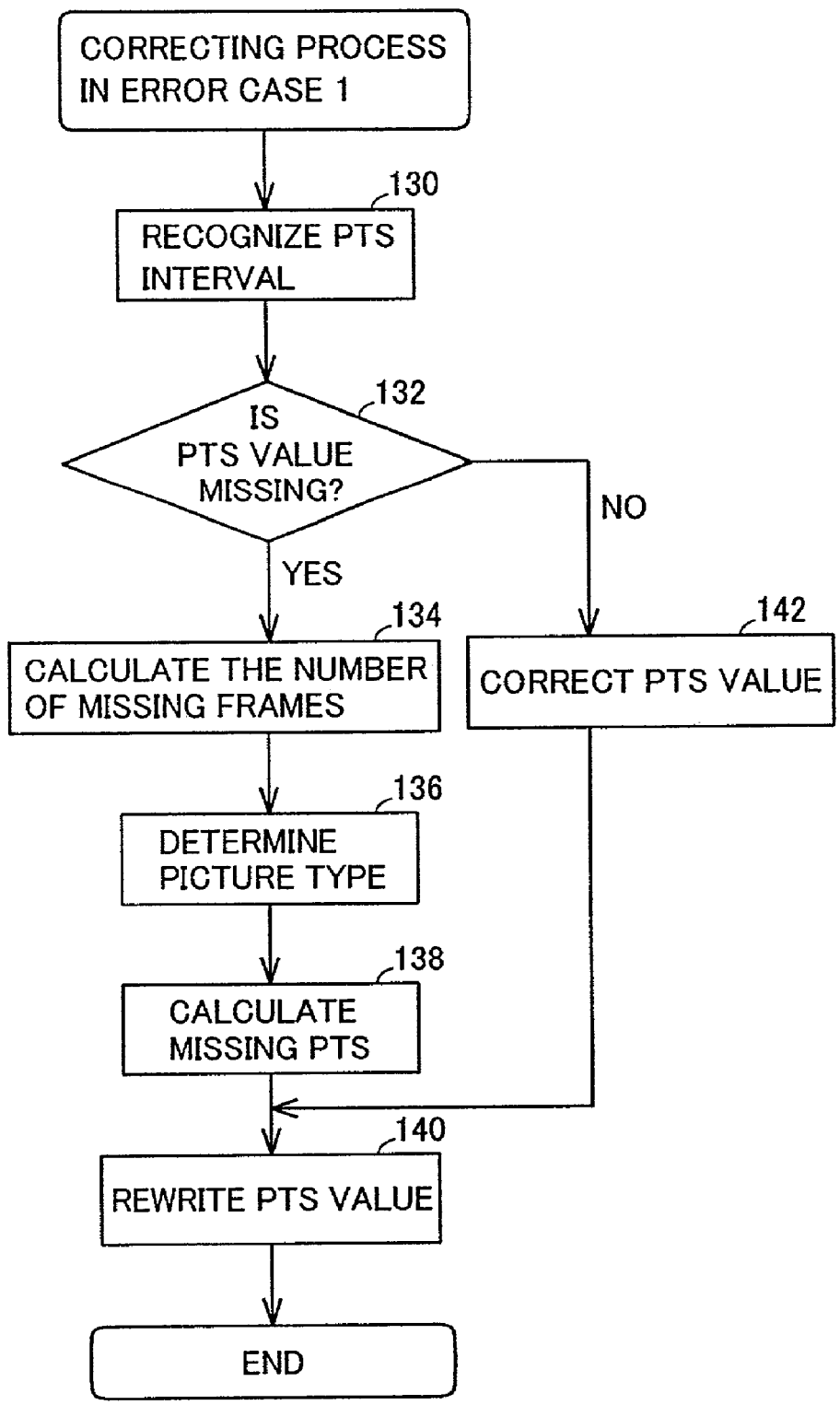
FIG. 11 is a flow chart of the correcting process in the first error case.

Referring to FIG. 11, in the first error case, video error correcting unit 60 shown in FIG. 7 operates as follows. The first error case corresponds to the case where the interval of the PTS values is abnormal and no sync byte error exists.

First, a normal PTS interval is recognized (130). It is then checked whether there are any PTS values missing (132). If no PTS value is missing but continuity is not being maintained, correction is made for the relevant PTS values using the preceding and succeeding PTS values that are considered to be normal (142). The PTS values of the PTS header are rewritten with the corrected PTS values (140), and the process is completed. In the case where PTS values are missing and the interval between the existent PTS values is longer than the normal interval, then the number of missing frames is calculated based on the relation between the PTS values (134), and the respective picture types are determined (136). Further, the missing PTS values are calculated (138), and the PTS values are rewritten with the obtained PTS values (140). The picture types thus determined are used for generation of dummy packets including dummy data.

Figure 12:
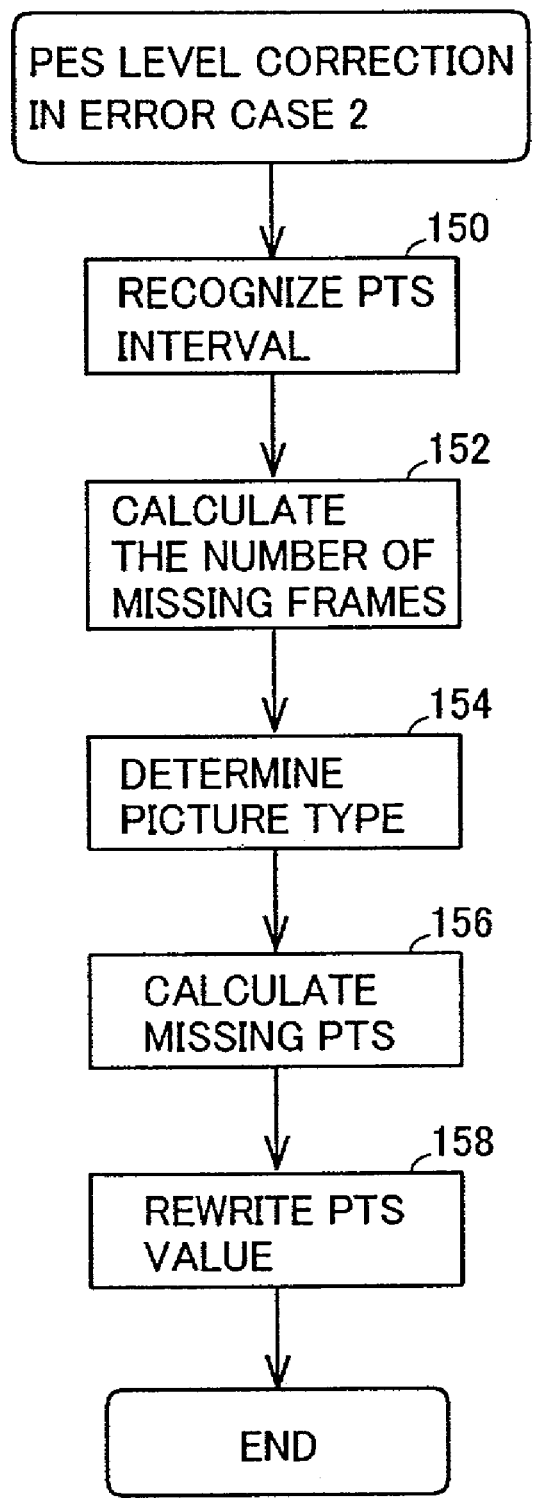
FIG. 12 is a flow chart of the correcting process at the PES level in the second error case.

In the second error case (124) in FIG. 10, video error correcting unit 60 performs the process as shown in FIG. 12. The second error case corresponds to the case where not only the PTS value is abnormal, but also there exists a sync byte error. It means that the TS error is not as simple as garbled data, but is missing of data.

Referring to FIG. 12, a normal PTS interval is recognized first (150). The number of frames considered to be missing is calculated based on the PTS values (152). The picture types of the frames are determined (154). PTS values are then calculated (156), which are used to rewrite the PTS values (158).

Figure 13:
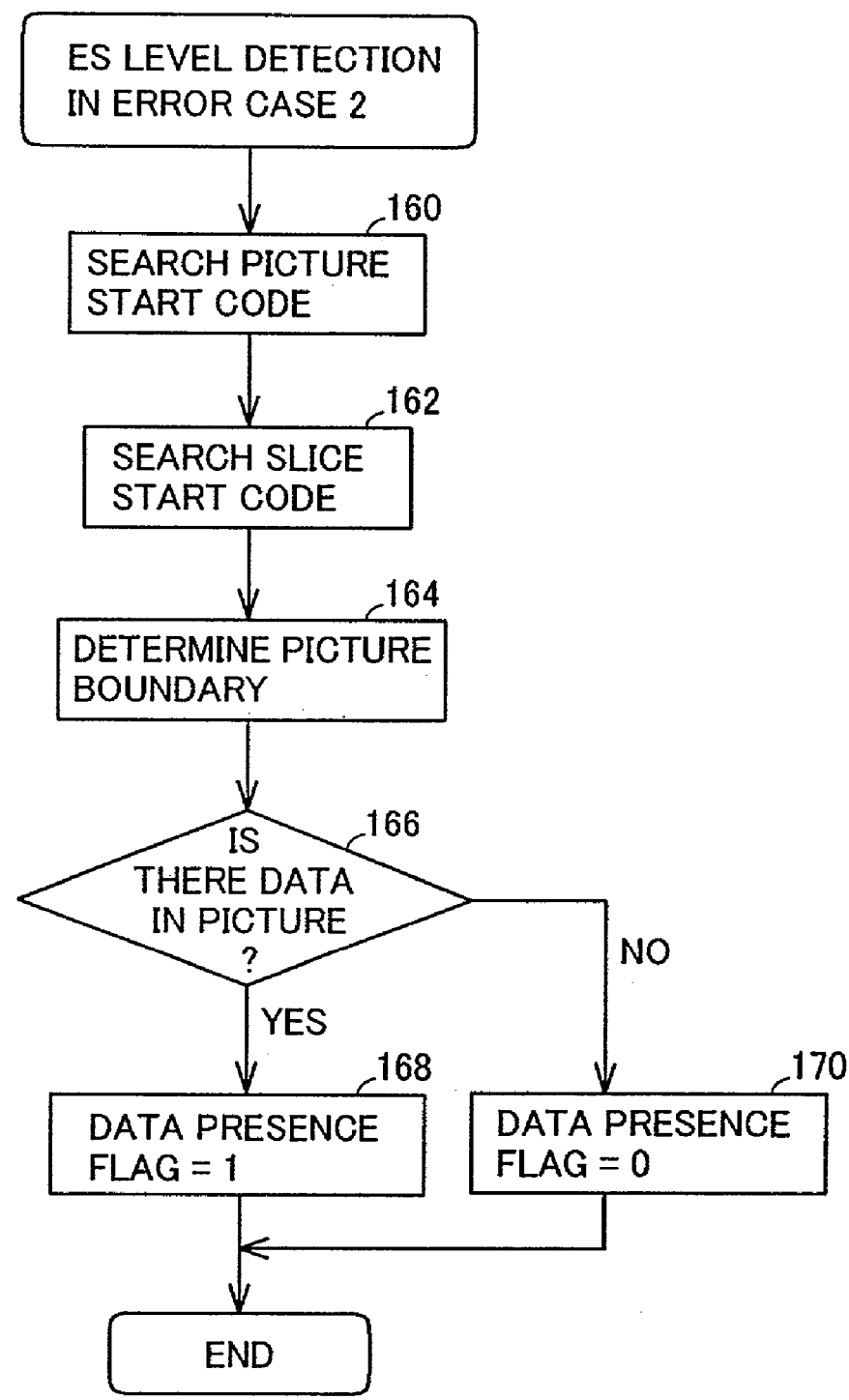
FIG. 13 is a flow chart of the ES level detecting process in the second error case.

ES level error detecting unit 84 shown in FIG. 6 performs error detection at the ES level through the following operations. Referring to FIG. 13, a picture start code within the V-PES is retrieved to determine a picture boundary (160). If the picture start code is not detected, a slice start code is further retrieved (162). The picture boundary is determined based on the picture start code or slice start code detected (164).

It is determined whether there is data within the determined picture boundary (or in the picture) (166). If data is present within the picture, a "data presence flag" is set to 1. If there is no data therein, the data presence flag is set to 0. The process is completed once the flag is set.

ES correcting unit 92 makes a correction with reference to the data presence flag. Hereinafter, the ES correcting process carried out by ES correcting unit 92 will be described referring to FIG. 14. First, it is determined whether the data presence flag is set to 1 (182). If so, it is further determined whether there is a picture header within the data (184). If there is no picture header therein, a picture header is generated (186).

The picture header includes a picture type and a temporary reference as the parameters. The picture type is 3-bit information that identifies the type of the relevant picture. The temporary reference designates an order of the relevant picture within a picture group called GOP (Group Of Pictures) in the MPEG standards. In the picture header generating process, the temporary reference is determined by obtaining the order within the GOP incremented from 0. The picture type is estimated from the preceding and succeeding picture types or from the adjacent GOP structure.

Figure 15:
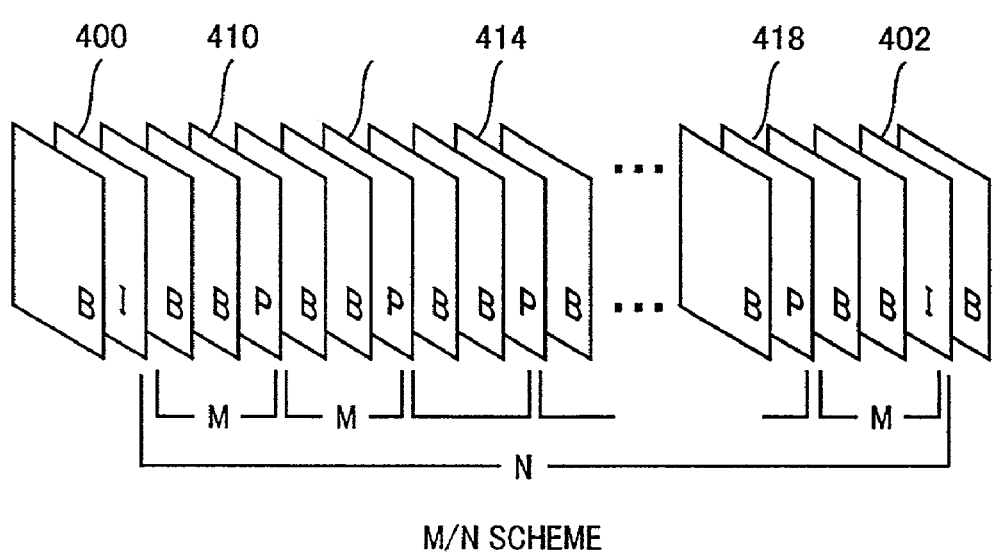
FIG. 15 shows an example of picture arrangement in the MPEG scheme.

The way of estimating the picture type will now be described with reference to FIG. 15. As seen from FIG. 15, GOP consists of I pictures, P pictures and B pictures. In the MPEG data, the interval of the pictures of the same type is predetermined as shown in FIG. 15. For example, the interval between an I picture 400 and the adjacent I picture 402 is set to N pictures, and the interval between each two neighboring P pictures 410, 412, 414, . . . , 418 sandwiched between I pictures 400 and 402 or the interval between the P picture and the adjacent I picture 400 or 402 is set to M pictures (such picture arrangement is called the M/N scheme using the reference characters M and N). Thus, calculating in advance the values corresponding to M and N of this example from normal picture arrangement makes it possible to estimate the type of the picture in an arbitrary position.

Once the picture header is generated, it is determined whether there is ES data within the frame (188). If the ES data exists, the process is completed. This is because, if dummy ES data were inserted despite the presence of the ES data, the code amount of the data would be increased, which might cause buffer underflow or overflow in the ES decoder.

If it is determined that there is no ES data in step 188, dummy ES generating unit 102 shown in FIG. 9 is used to select the ES data of the necessary picture type at selector 116, and then, selector 104 shown in FIG. 8 selects and outputs the output of dummy ES generating unit 102. If it is unnecessary to generate the dummy ES, selector 104 in FIG. 8 selects and outputs the output of ES header correcting unit 100.

When it is determined that the data presence flag is not 1 (i.e., 0) in step 182, ES header correcting unit 100 in FIG. 8 first generates the picture header (194) as in step 186, which is selected and output by selector 104. Next, dummy ES generating unit 102 generates dummy ES according to the picture type information provided from PES header correcting unit 90, which is output via selector 104. At this time, the image information of black and gray, the skip code or the like is prepared as the dummy data. Inserting such dummy data prevents an increase of the code amount within the data.

Although the processes associated with the video signals have been described above, audio signals can also be processed in the same manner.

In the V-PES (and A-PES) having the garbled data recovered and/or the dummy data inserted to the data missing portion(s), a format error no longer exists. The PS obtained by multiplexing them and output from PS multiplexer 48 (FIG. 5) does not include an error as in the conventional case. Accordingly, the PS can be recorded on a DVD without a problem.

Second Embodiment

In the description of the apparatus of the first embodiment above, recovery of the video data has been explained in detail, which is also applicable to recovery of the audio data. The apparatus of the first embodiment, however, exhibits a problem that, when an audio coding scheme with a fixed frame length is being employed, misalignment between the frame boundary of the audio ES extracted from the audio PES header and the frame boundary of the actual ES cannot be corrected. One of the common audio coding schemes called an AC-3 scheme is known as the coding scheme with a fixed frame length. The problem arises not only with the AC-3 scheme, but also with any other schemes employing the fixed frame lengths.

Thus, besides the configuration as in the first embodiment, the apparatus of the second embodiment is provided with an additional configuration to realize the procedure for detecting and correcting an error due to misalignment of the frame boundaries in the audio PES employing such a coding scheme with the fixed frame length.

Figure 16:
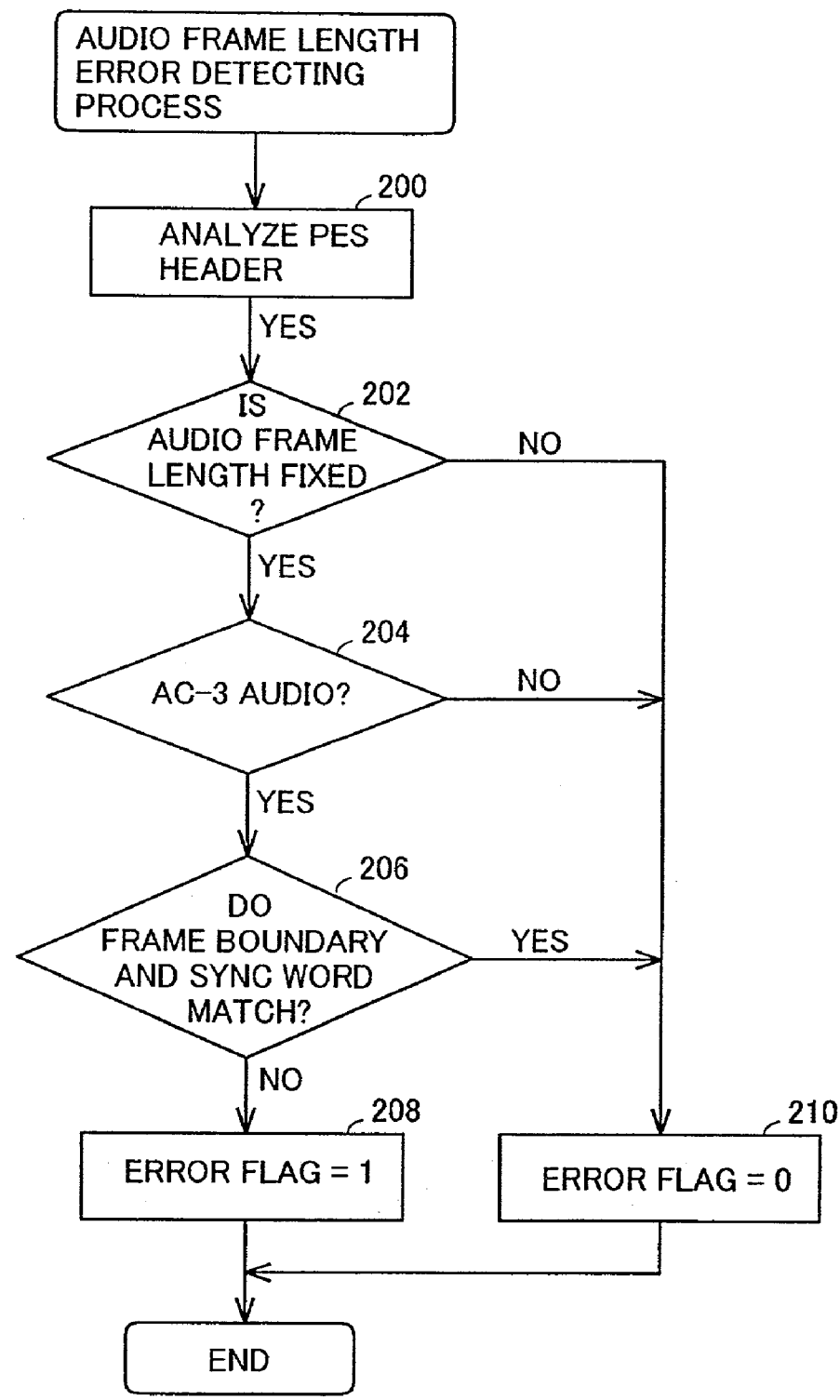
FIG. 16 is a flow chart of the audio frame length error detecting process in the apparatus according to a second embodiment.

FIG. 16 is a flow chart of the audio frame length error detecting process for the procedure. Referring to FIG. 16, the PES header is first analyzed (200), and it is determined whether the relevant audio coding scheme employs a fixed frame length (202). If not, an error flag is set to 0 (210) and the process is terminated.

If the coding scheme employs the fixed frame length, it is further determined whether the coding scheme is the AC-3 scheme (204). This determination is made using code characteristics specific to a coding scheme. In the case of the AC-3 scheme, a sync word "0b77" is added to the head of a frame. Thus, the error can be detected by examining whether the position of the frame boundary recognized from the PES header and the position of the sync word detected from each frame are aligned with each other. If the coding scheme is not the AC-3 scheme, the error flag is set to 0 (210), and the process is terminated.

If the coding scheme is the AC-3 scheme, it is determined, as described above, whether the position of the frame boundary recognized from the PES header and the position of the sync word at the frame head are aligned with each other (206). If so, the error flag is set to 0 (210). Otherwise, the error flag is set to 1 (208), and the process is terminated.

Figure 17:
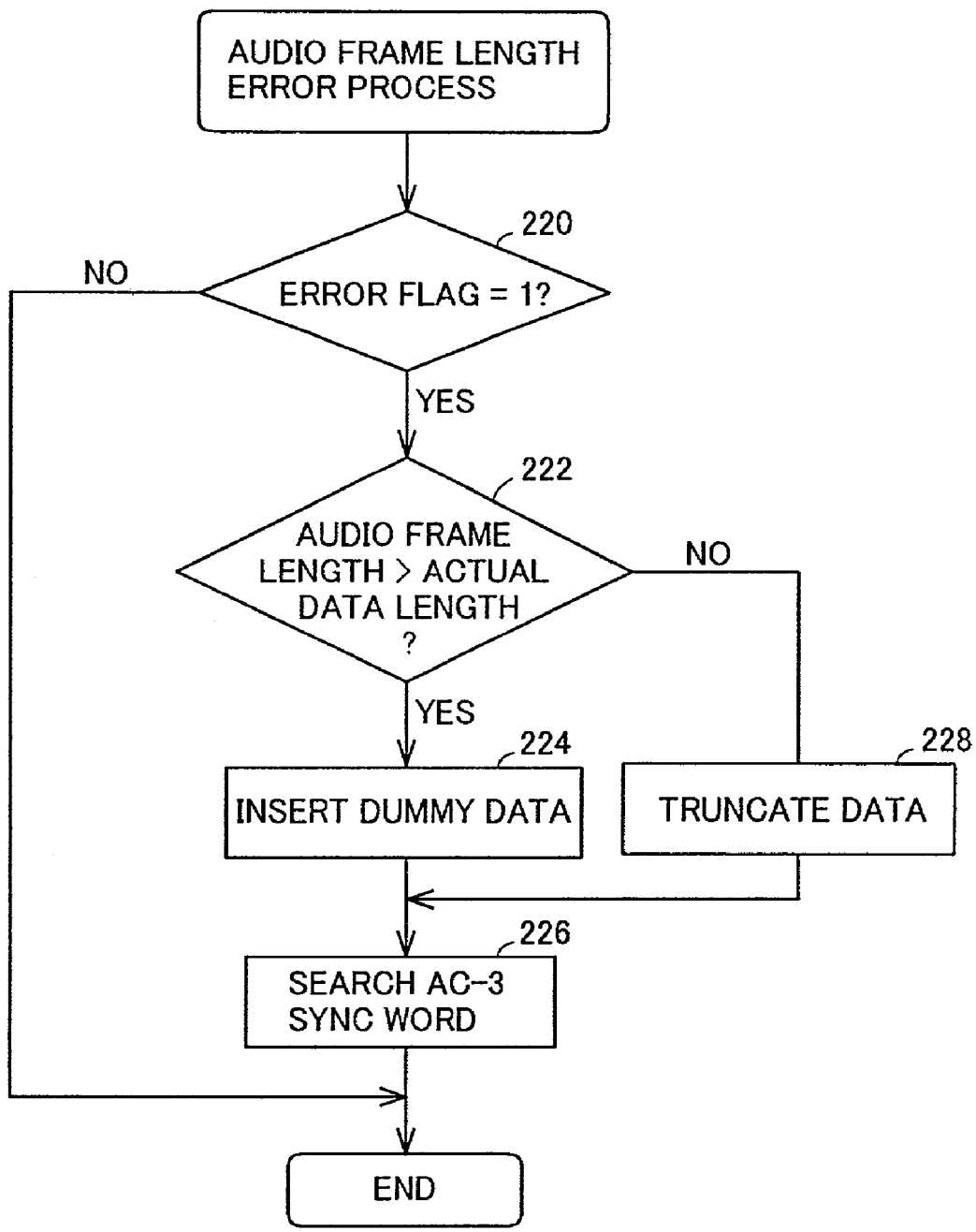
FIG. 17 is a flow chart of the audio frame length error correcting process in the apparatus of the second embodiment.

Referring to FIG. 17, the error correction is carried out as follows. First, it is determined whether the error flag is set to 1 (220). If not, the process is terminated.

If the error flag is set to 1, the frame length recognized from the PES header and the frame boundary recognized from the interval between the sync words are compared with each other. If the actual data is shorter than the frame length designated by the header, dummy data is inserted in the data to achieve the designated frame length (224). Otherwise, the data is truncated to match the actual data length to the frame length (228). In either case, when the frame boundary designated by the header and the sync word are misaligned, the sync word is retrieved in the audio ES (226) to recognize the correct frame boundary.

With the apparatus of the present embodiment, when the audio data coding scheme is employing a fixed frame length, the error of disagreement between the frame length of the ES extracted from the PES header and the frame boundary of the actual ES can be corrected to adjust the frame boundary of the actual ES to the frame length.

Third Embodiment

Figure 1:
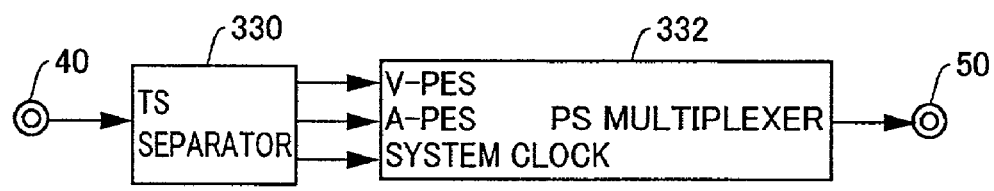
FIG. 1 is a block diagram of an example of the conventional stream converting apparatus.

The apparatuses of the first and second embodiments correspond to the conventional art shown in FIG. 1. The techniques as in the first and second embodiments can also be applied to the conventional art shown in FIG. 2. A block diagram of such a stream converting apparatus of the third embodiment of the present invention is shown in FIG. 18.

Figure 2:
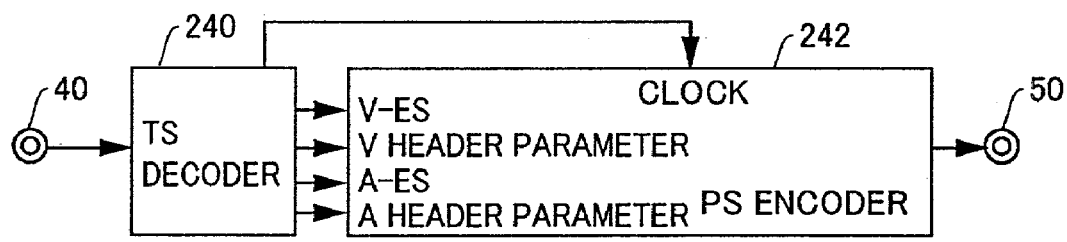
FIG. 2 is a block diagram of another example of the conventional stream converting apparatus.
Figure 18:
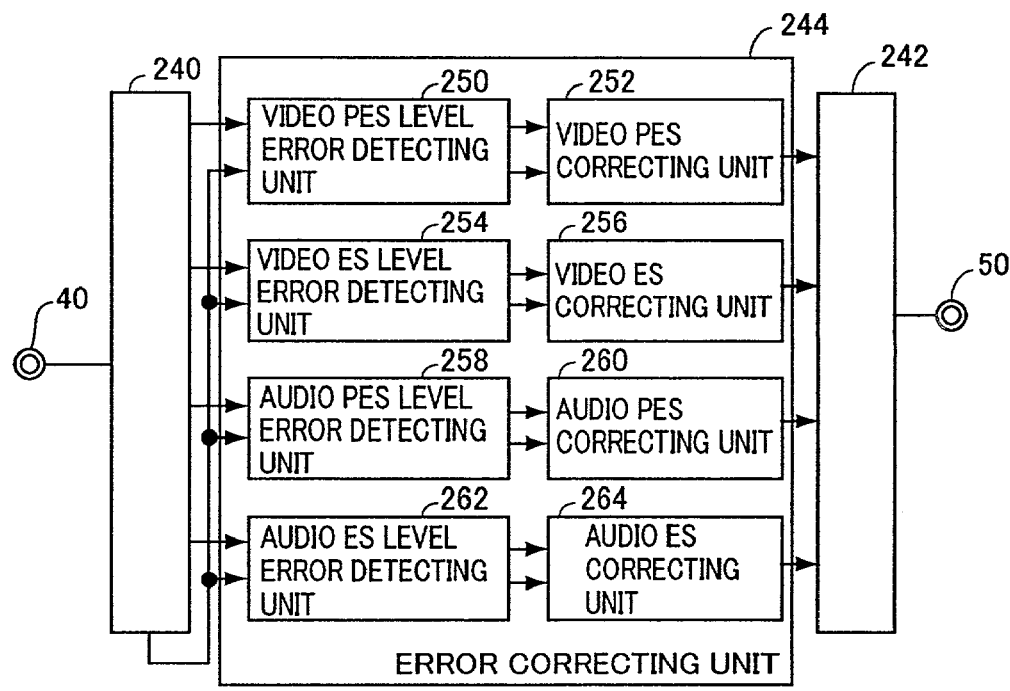
FIG. 18 is a block diagram of the apparatus according to a third embodiment.

Referring to FIG. 18, the apparatus includes an error correcting unit 244 additionally provided between TS decoder 240 and PS encoder 242 of the conventional stream converting apparatus shown in FIG. 2.

Error correcting unit 244 includes a video PES level error detecting unit 250, a video PES correcting unit 252, a video ES level error detecting unit 254, a video ES correcting unit 256, an audio PES level error detecting unit 258, an audio PES correcting unit 260, an audio ES level error detecting unit 262, and an audio ES correcting unit 264.

Video PES level error detecting unit 250 has the same configuration as and operates in the same manner as PES level error detecting unit 82 shown in FIG. 6. Video PES correcting unit 252 has the same configuration as and operates in the same manner as PES header correcting unit 90 shown in FIG. 7. Video ES level error detecting unit 254 has the same configuration as and operates in the same manner as ES level error detecting unit 84 shown in FIG. 6. Video ES correcting unit 256 has the same configuration as and operates in the same manner as ES correcting unit 92 shown in FIG. 7. Audio PES level error detecting unit 258, audio PES correcting unit 260, audio ES level error detecting unit 262 and audio ES correcting unit 264 are audio versions of the respective units 250, 252, 254 and 256.

Error correcting unit 244 in FIG. 18 has a configuration identical to the combination of error detecting unit 46 and error correcting unit 44 of the apparatus of the first embodiment. However, PES separator 80 (FIG. 6) for error detection is unnecessary, since the TS has been separated into the PES header parameters and ES by TS decoder 240. Similarly, a PES multiplexer is unnecessary within error correcting unit 244, since PS encoder 242 incorporates the PES multiplexing circuit.

With the apparatus having such a configuration of the third embodiment, the same effects as in the apparatus of the first embodiment can be accomplished. Further, the same procedures as in the apparatus of the second embodiment may be realized to achieve the similar effects.

Fourth Embodiment

Figure 14:
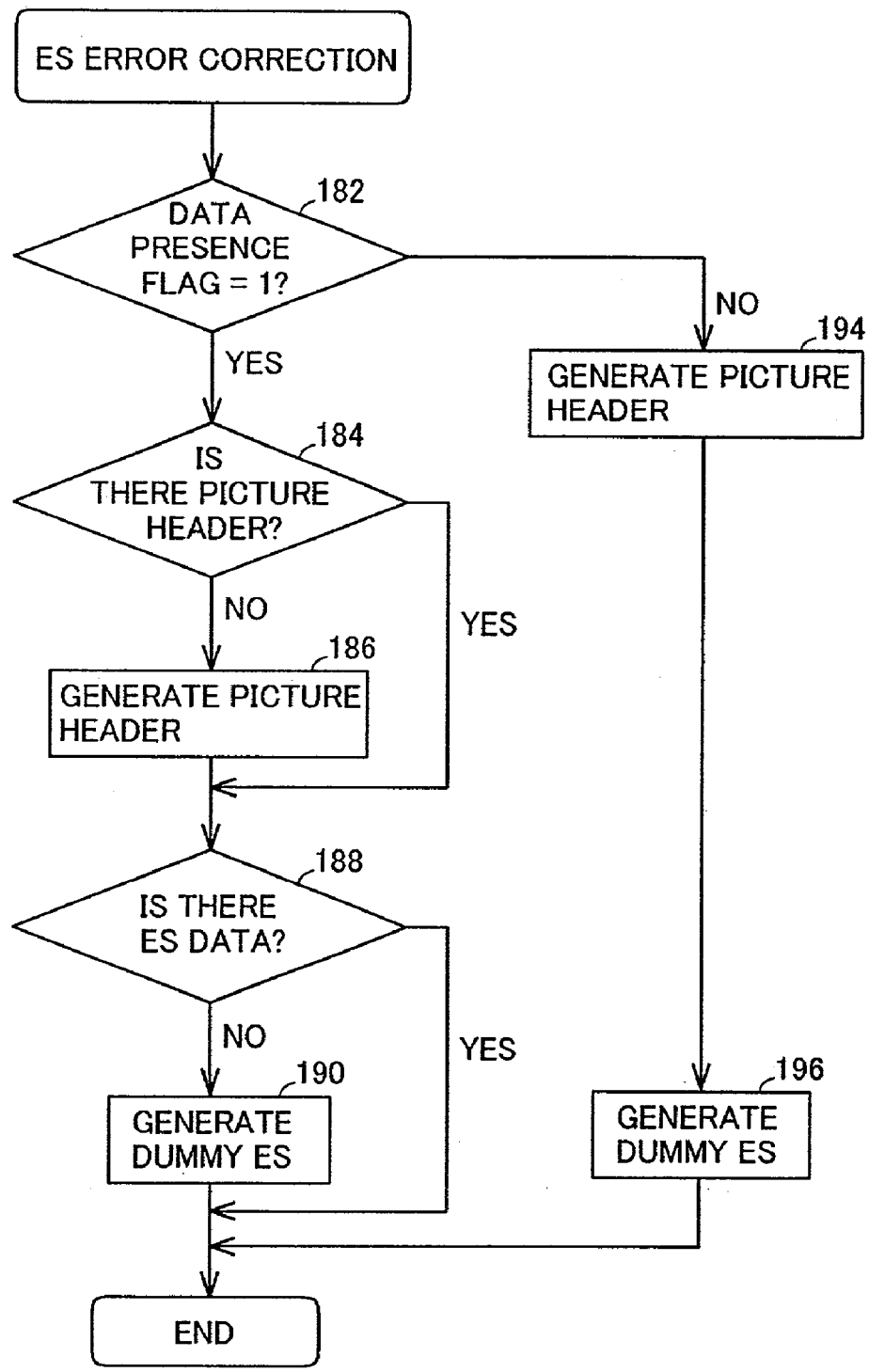
FIG. 14 is a flow chart of the error correcting process at the ES level.

In the apparatuses of the first and third embodiments, the ES error correcting process as shown in FIG. 14 only makes a determination as to whether there exists an ES at or under the picture layer. Such a determination however is insufficient for determining whether all the ES at and under the slice layer exist. This hinders recovery of the ES when, for example, a slice start code within an image is incomplete. The apparatus of the fourth embodiment is directed to solve the problem.

With the apparatus of the fourth embodiment, a function is realized to check whether every slice start code exists within an ES and, if not, to insert dummy slice data in the data.

Figure 19:
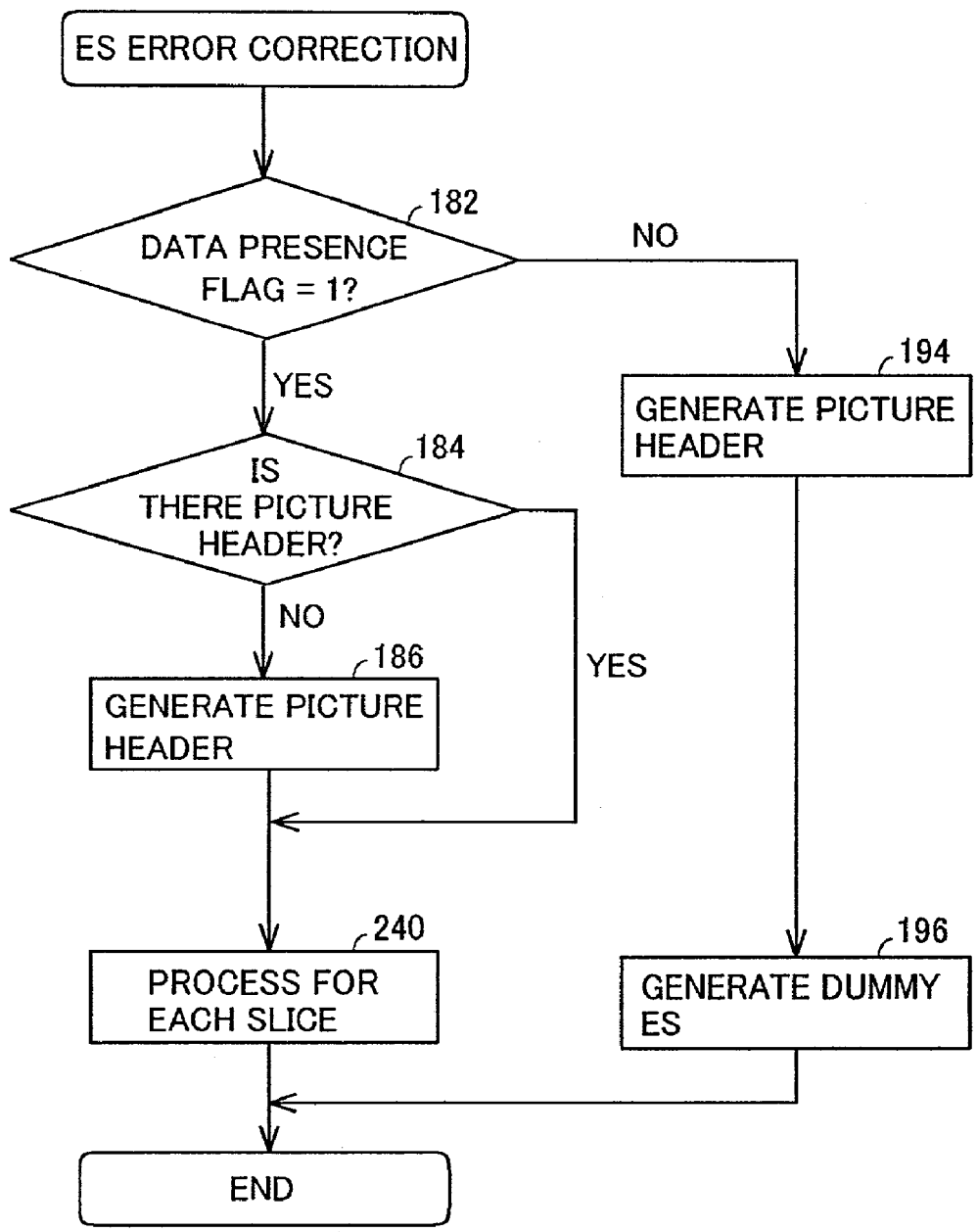
FIG. 19 is a flow chart of the ES level error correcting process in the apparatus according to a fourth embodiment.

FIG. 19 is a flow chart of the ES error correcting process of the apparatus of the present embodiment. This process replaces the one shown in FIG. 14 of the processes carried out by the apparatus of the first embodiment. In FIG. 19, the same process as in FIG. 14 is denoted by the same reference character, and detailed description thereof is not repeated. The process in FIG. 19 differs from the process in FIG. 14 in that steps 188 and 190 in FIG. 14 are replaced with a step 240 of performing the process for each slice. A flow chart of this process for each slice is shown in FIG. 20, and a block diagram of the dummy ES generating unit effecting the relevant process is shown in FIG. 21.

Figure 20:
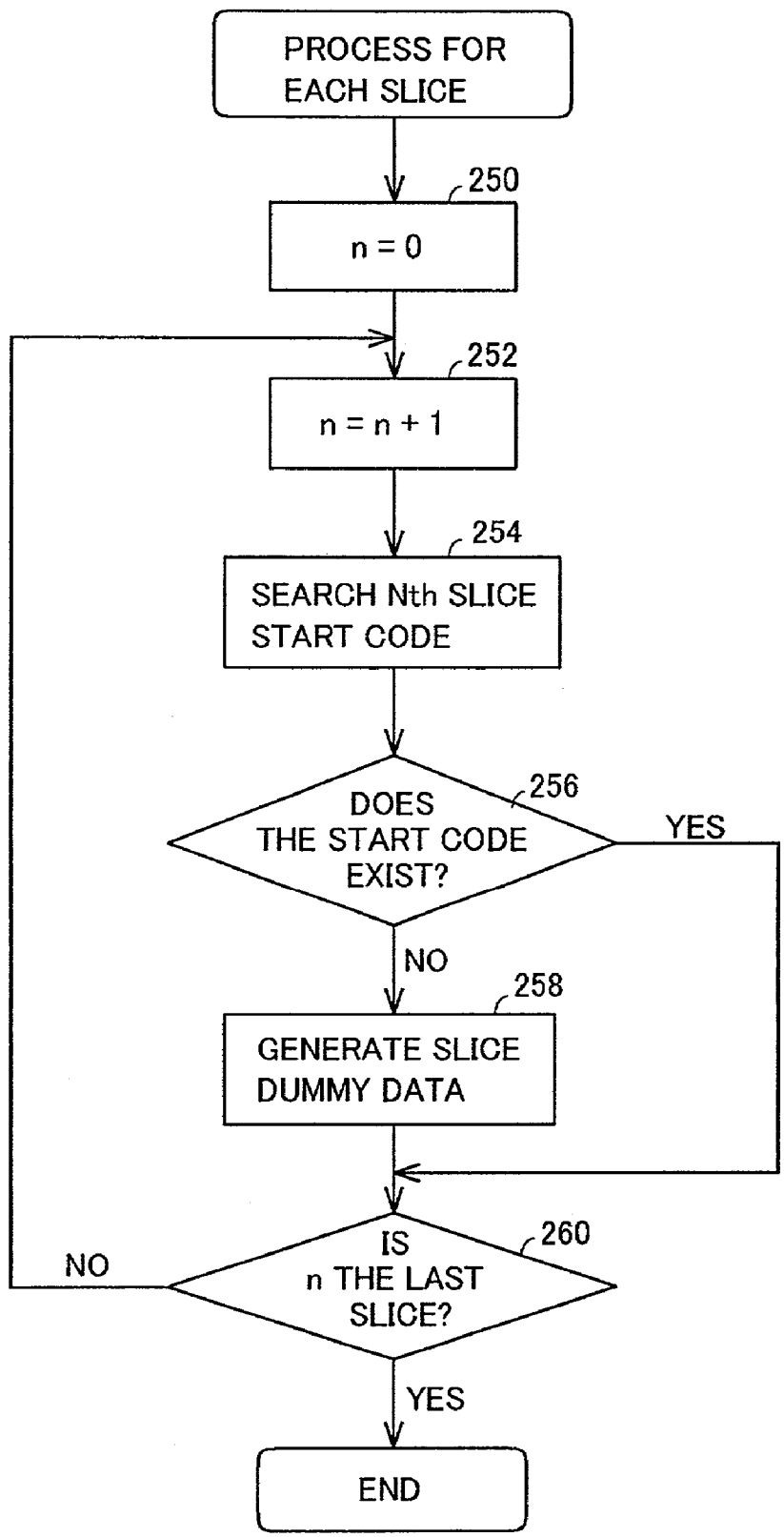
FIG. 20 is a flow chart of the process conducted for each slice in the apparatus of the fourth embodiment.
Figure 21:
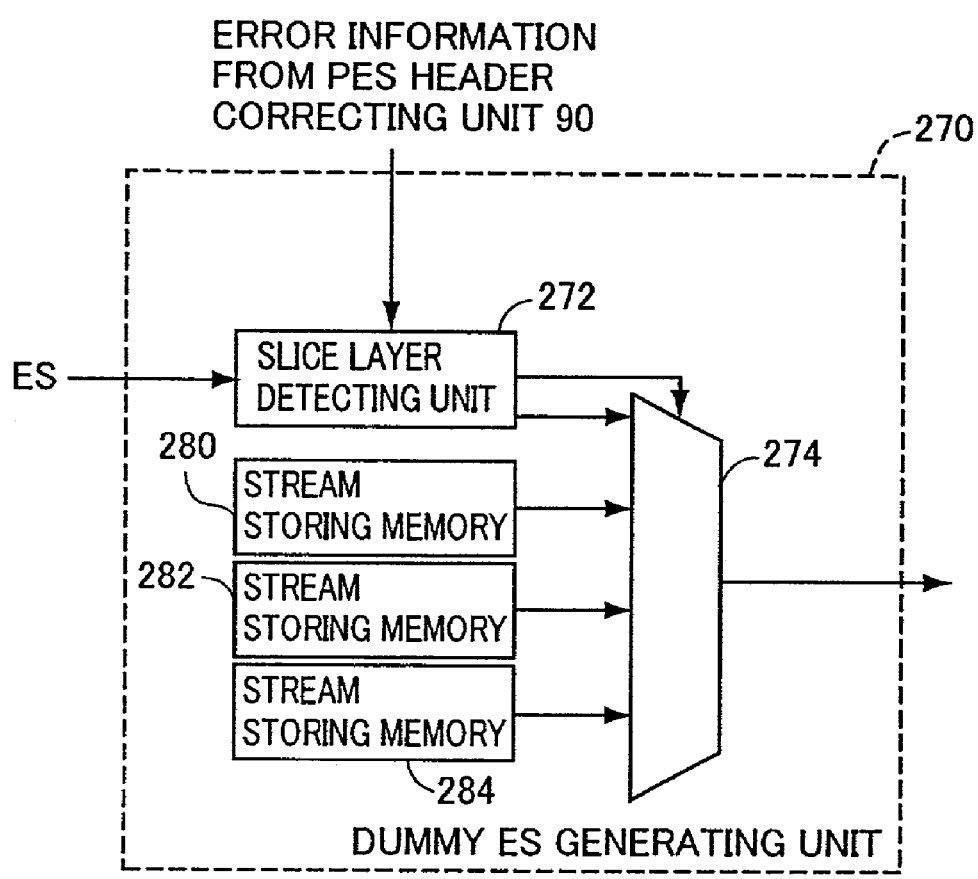
FIG. 21 is a block diagram of the dummy ES generating unit of the apparatus of the fourth embodiment.

Referring to FIG. 20, the process for each slice is started by substituting 0 for a variable n representing the slice start code (250). The slice start code starts at 1. Next, 1 is added to this variable n (252). The n-th slice start code is searched (254), and it is determined whether it exists or not (256).

If the n-th slice start code does not exist, a dummy slice start code is inserted to the data (258).

Next, it is determined whether the n indicates the last slice. If not, the control returns to step 252. In this manner, the slice start code is searched within a range from slice(s) at the top to slice(s) at the bottom, and the dummy slice start code is inserted for every missing code in the data. In the case of the NTSC scheme, and if one slice is formed with all the horizontal macro block lines, then the number of slices becomes 30, with the 30th slice constituting the bottom.

Referring to FIG. 21, dummy ES generating unit 270 replacing dummy ES generating unit 102 in FIG. 9 includes: a slice layer detecting unit 272 that has a function to perform the process steps 252–256 and 260 in FIG. 20 and to output the input stream data; stream storing memories 280, 282 and 284 that store, in advance, dummy data corresponding to I, P and B pictures, respectively; and a selector 274 that selects and outputs one of the outputs of slice layer detecting unit 272 and stream storing memories 280, 282 and 284, based on the control of slice layer detecting unit 272. Stream storing memories 280, 282 and 284 replace stream storing memories 110, 112 and 114 in FIG. 9.

The processes described above can be implemented as selector 274 selects and outputs either one of the outputs of slice layer detecting unit 272 and stream storing memories 280, 282 and 284 based on the control of slice layer detecting unit 272.

With the apparatus of the fourth embodiment, even if the slice start codes within the image are incomplete, it is possible to recover the ES data such that every slice start code exists in the data. This enables stream conversion without fault. Further, compared to the case where the dummy ES data are inserted in the picture layer, the number of bytes of the dummy ES data being inserted is lessened. This leads to an advantage that the capacities required for stream storing memories 280, 282 and 284 become smaller than those for stream storing memories 110, 112 and 114.

Fifth Embodiment

In the apparatuses of the first through fourth embodiments, the code amount in the PS being output is decreased from that in the TS being input. This is because the TS packets are shorter than the PS packets, and thus, the TS packets outnumber the PS packets, resulting in that the code amount of headers as a whole becomes greater in the TS than in the PS. It means that, conversely, the data amount will increase when the converted PS is re-converted to the TS.

This poses the following problem. When performing re-conversion of PS to TS with a medium (optical disc, hard disc or the like) limited in recording capacity, there may arise a case where the re-converted TS data having a large data amount cannot be written into the medium due to the shortage of the capacity. The present embodiment relates to a stream converting apparatus that can prevent such a problem.

Figure 22:
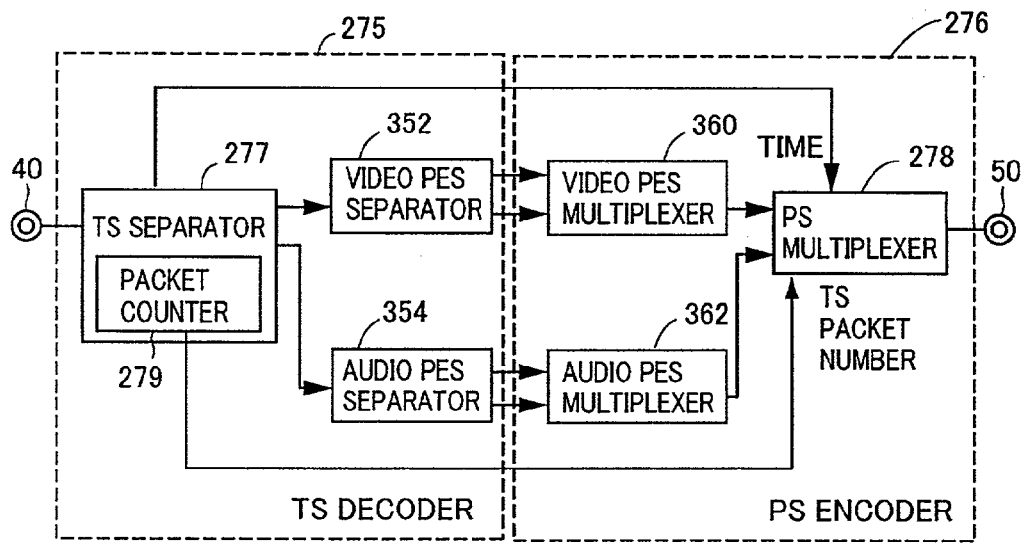
FIG. 22 is a block diagram of the stream converting apparatus according to a fifth embodiment.

FIG. 22 is a block diagram of the stream converting apparatus according to the fifth embodiment. Referring to FIG. 22, the apparatus includes a TS decoder 275 and a PS encoder 276.

TS decoder 275 differs from TS decoder 240 of the conventional stream converting apparatus described with reference to FIG. 3 in that TS separator 350 is replaced with a TS separator 277 that includes a packet counter 279 counting the number of packets of the TS being input and outputting the TS packet number. PS encoder 276 differs from PS encoder 242 of the conventional stream converting apparatus described in conjunction with FIG. 4 in that PS multiplexer 364 is replaced with a PS multiplexer 278 that has a function to receive from TS separator 277 the system clock information and the TS packet number, to multiplex them to PS, to compare the code amount of the generated PS with the TS code amount, and to insert padding packets in the PS if necessary.

Figure 3:
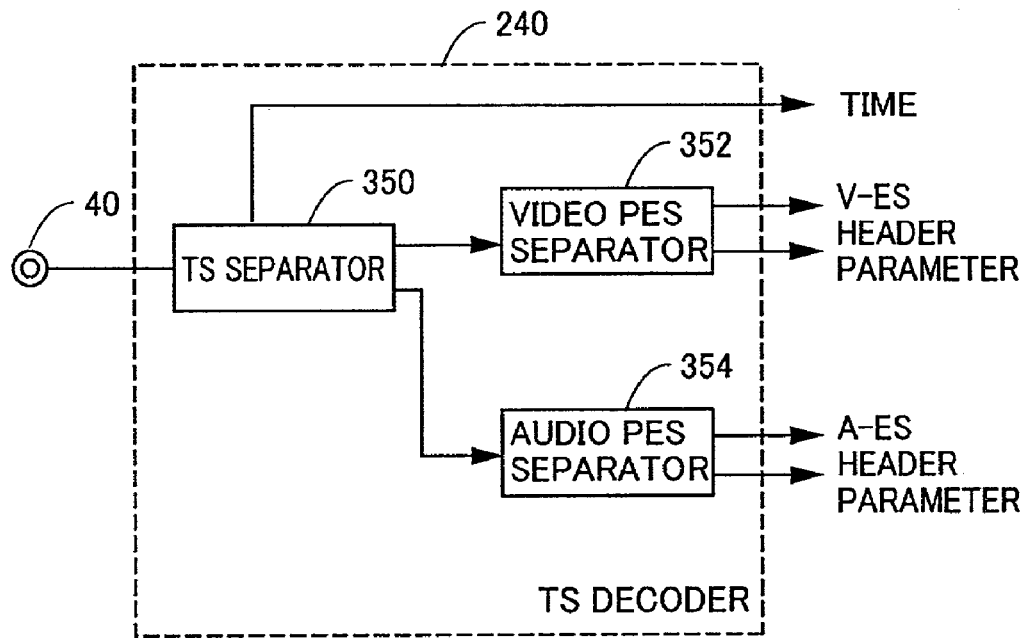
FIG. 3 is a block diagram of the TS decoder in the apparatus shown in FIG. 2.
Figure 4:
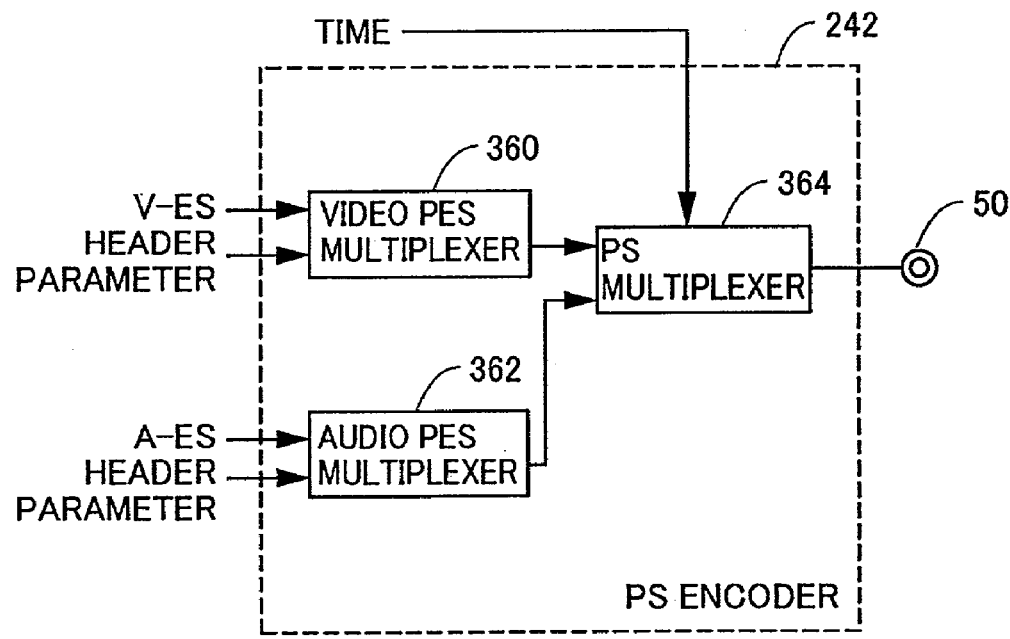
FIG. 4 is a block diagram of the PS multiplexer in the apparatus shown in FIG. 2.

In FIG. 22, the same components as in FIG. 3 or in FIG. 4 are denoted by the same reference characters. They are identical in names and functions, and thus, detailed description thereof is not repeated.

Figure 23:
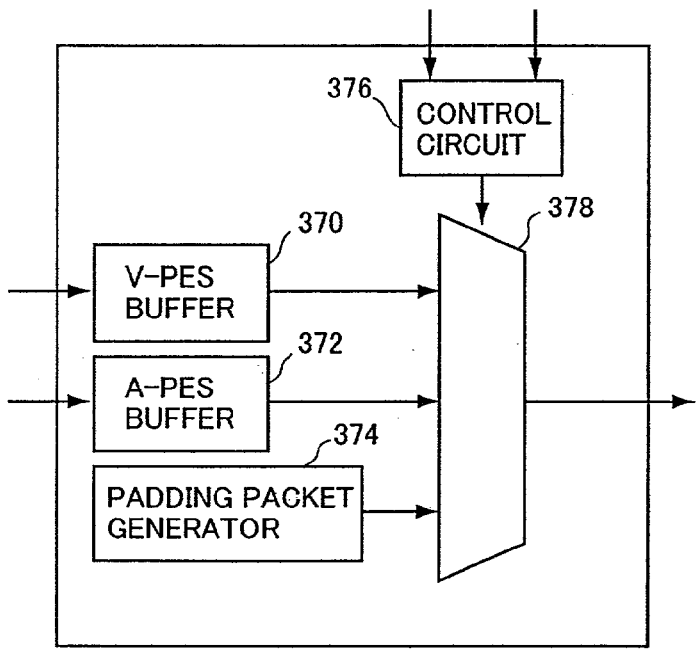
FIG. 23 is a block diagram of the PS multiplexer.

Referring to FIG. 23, PS multiplexer 278 includes: a V-PES buffer 370 that receives V-PES from video PES separator 352 and video PES multiplexer 360; an A-PES buffer 372 that receives A-PES from audio PES separator 354 and audio PES multiplexer 362; a padding packet generator 374 that generates a padding packet; a selector 378 that receives outputs of V-PES buffer 370, A-PES buffer 372 and padding packet generator 374; and a control circuit 376 that receives the system clock information and the TS packet number from TS separator 277 and controls selector 378 to multiplex the V-PES and A-PES to a PS as well as to select the padding packet from padding packet generator 374 for insert into the PS when the PS code amount is smaller than the TS code amount.

Control circuit 376 recognizes the TS and PS code amounts from the TS packet number and the number of packets of the multiplexed PS, respectively, and inserts the padding packets into the PS by the code amount corresponding to their difference (TS code amount−PS code amount).

Thus making the PS code amount equal to the TS code amount eliminates the possibility that the re-converted data cannot be written into the original recording medium due to the increase of the code amount.

It will be apparent to a person skilled in the art that the adjustment of the code amount by the present embodiment can readily be combined with the first through fourth embodiments above.

Sixth Embodiment

In the apparatuses of the first through fifth embodiments, an error within a stream has been recovered with the control of dedicated hardware and a sequencer. However, the present invention is not limited to such embodiments. For example, a group of software for execution of the various kinds of functions described above may run on a general-purpose computer to carry out the stream conversion, while recovering the error, in the same manner.

Figure 24:
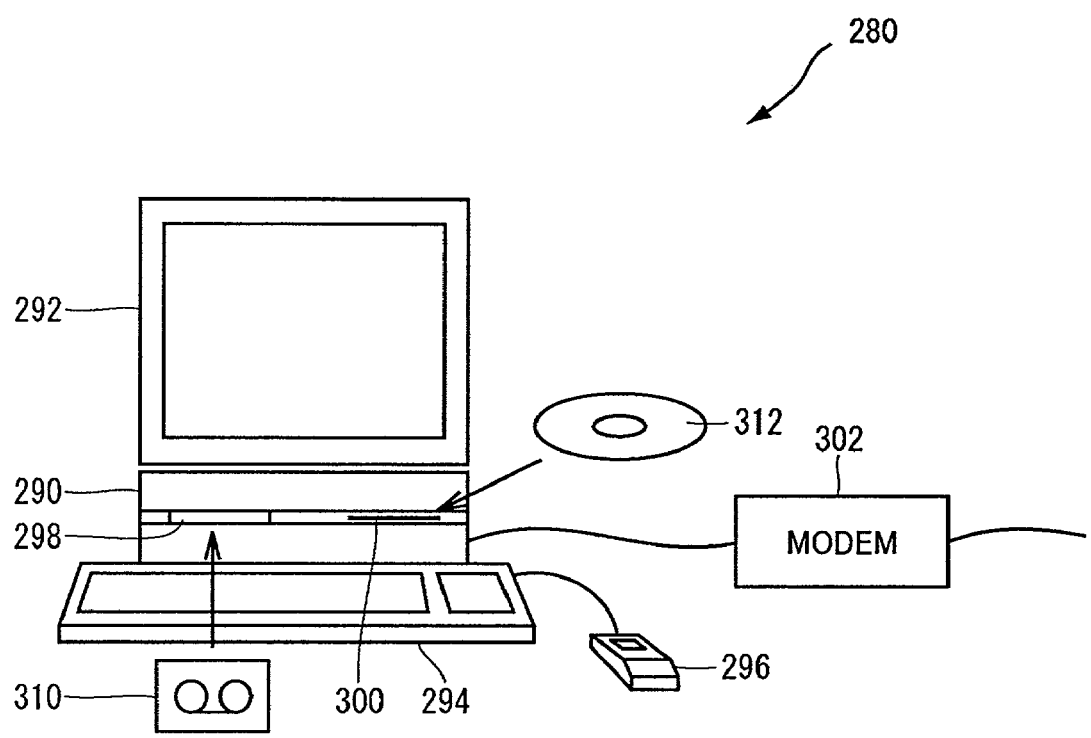
FIG. 24 shows the apparatus according to a sixth embodiment.

FIG. 24 shows a common computer system. Referring to FIG. 24, the computer system 280 includes: a computer 290; a monitor 292, a keyboard 294, a mouse 296 and a modem 302 connected to computer 290; and a tape driver 298 and a CD-ROM (Compact Disc Read Only Memory) driver 300 built in computer 290. Tape driver 298 and CD-ROM driver 300 can read from a tape 310 and a CD-ROM 312, respectively, software recorded thereon for implementation of the stream converting apparatus of the present embodiment on computer system 280, and transfer the software to computer 290. Modem 302 allows computer 290 to communicate with a computer on another network via a telephone line. It is of course possible to transfer the software from another network via modem 302 to computer 290.

Alternatively, a network interface may further be provided for communication with another computer on the same network.

Although the tape and CD-ROM have been exemplified above, the media having the computer readable programs recorded thereon for implementation of the software of the present embodiment with computer 290 are not limited thereto. Other media conceivable include external hard disk, magneto-optical disk, flexible disk, DVD-ROM or RAM, flash memory complying with PCMCIA standards, radio communication, and infrared or other optical media, and any of which may be employed.

Figure 25:
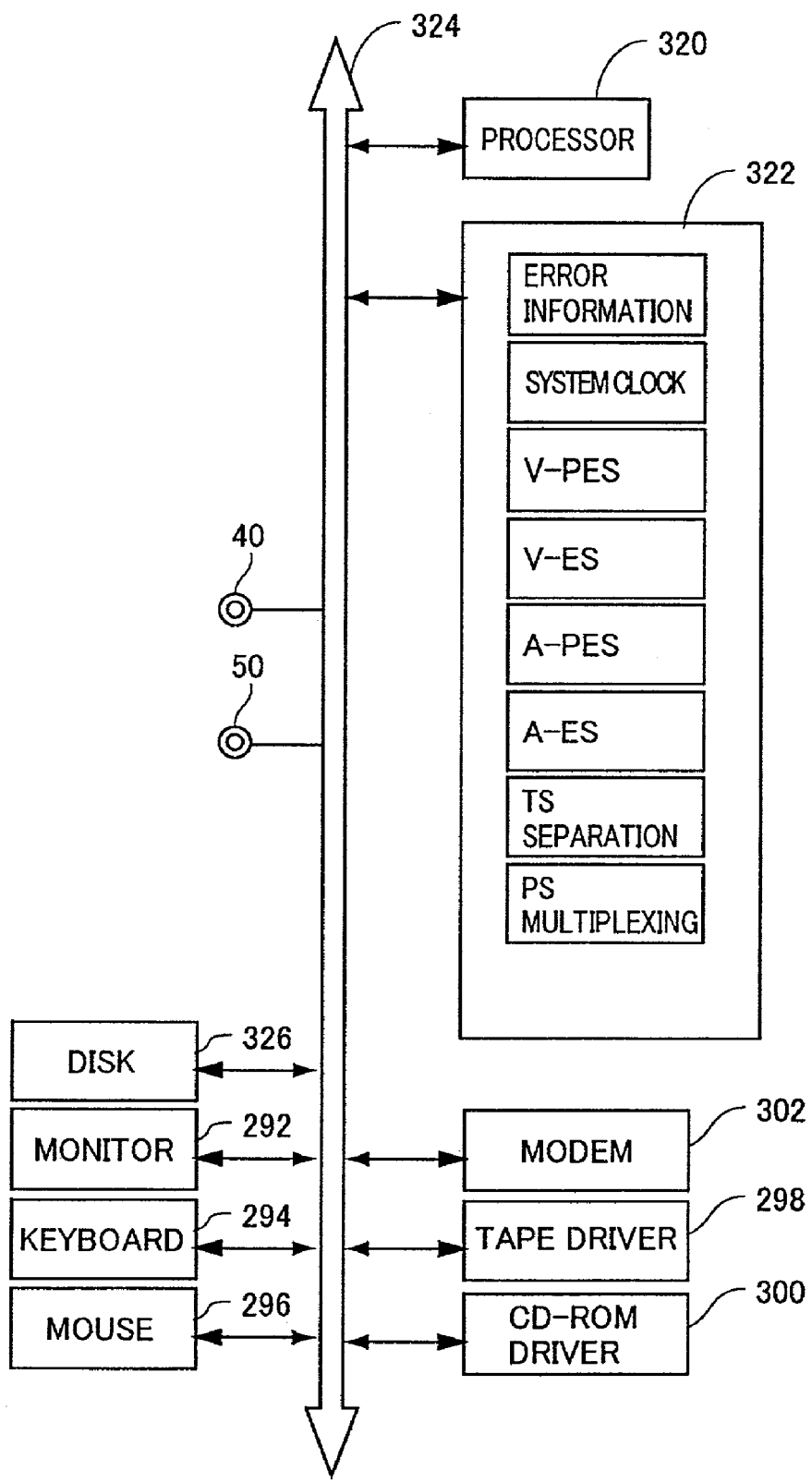
FIG. 25 is a block diagram of the apparatus of the sixth embodiment.

FIG. 25 is a block diagram of computer system 280 shown in FIG. 24. Referring to FIG. 25, computer system 280 includes: a processor 320; a bus 324 to which processor 320, a stream input terminal 40 and a stream output terminal 50 are connected; and memory 322, modem 302, tape driver 298, CD-ROM driver 300, disk 326, monitor 292, keyboard 294 and mouse 296 each connected to bus 324 through an appropriate interface.

Memory 322 includes, in addition to portions for storing data of error information, system clock, V-PES, A-PES, V-ES and A-ES, portions for storing a program for implementation of a function corresponding to that of the aforementioned TS separator and a program for implementation of a function corresponding to that of the PS multiplexer.

The hardware and software of the sixth embodiment can realize any of the first through fifth embodiments. In such a case, the software distributed as recorded on magnetic tape, CD-ROM, DVD or another recording medium becomes a component of the present invention. In the case where the software is stored in a host computer on the network and sent to another computer as required, a storage prepared for the host and a communication medium used for sending the software are also regarded as components of the present invention.

As described above, according to the embodiments of the present invention, compared to the case where the second format data stream is generated from a data stream with an error included therein, the second format data stream obtained becomes more accurate.

In particular, compared to the case where the second format data stream is generated from a data stream including the error of destruction or missing of data, appropriate correction can be made according to the error types, so that the second format data stream obtained becomes more accurate.

Error detection is possible not only at the second level but also at the first level by determining the missing of data using the synchronization information error signal of the first level. Thus, compared to the case where the error detection is conducted only at the second level, the error detection can be effected in a smaller range, and appropriate correction corresponding thereto is enabled. Accordingly, the second format data stream obtained becomes more accurate.

Further, correction by inserting dummy data at the first level makes it possible to generate a more accurate second format data stream, while restricting the hardware amount necessary for the correction.

Since the dummy data is prepared as data or a code preselected to restrict the increase of the code amount, a large change in data amount of the second format data stream due to the correction is prevented.

Still further, padding data are inserted into data being converted in an amount to suppress a change in code amount before and after the correction. This prevents a problem that re-converted data otherwise increased in code amount cannot be written into a recording medium with a limited capacity due to the shortage of the recording capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A stream converting apparatus for converting a first format data stream into a second format data stream, said first format data stream being obtained by packetizing a first level data stream to generate a second level data stream and further multiplexing said second level data stream, the apparatus comprising:
   a stream extracting circuit extracting said second level data stream from said first format data stream;
   an error detecting circuit connected to an output of said stream extracting circuit and detecting an error included in said second level data stream output from said stream extracting circuit;
   a data correcting circuit connected to said error detecting circuit and correcting the error detected by said error detecting circuit to generate a proper-form second level data stream; and
   a multiplexer connected to an output of said data correcting circuit and multiplexing said second level data stream corrected by said data correcting circuit to generate said second format data stream; wherein said second level data stream is arranged in packets including packet headers, and said packet header includes system clock information associated with data, and said error detecting circuit includes a separating circuit separating and extracting said second level data stream from said first format data stream, and a clock error detecting circuit connected to an output of said separating circuit and detecting the error included in said second level data stream from a transition of said system clock information in the packet header of each packet in said second level data stream extracted by said separating circuit; and wherein said data correcting circuit includes a packet type determination circuit determining a packet type of each packet of said second level data stream that is determined to include the error by said clock error detecting circuit, a system clock information estimating circuit estimating the system clock information associated with each packet of said second level data stream that is determined to include said error, and a dummy data inserting circuit generating and inserting to the data stream a dummy packet including dummy data having the system clock information estimated by said system clock information estimating circuit and of the packet type determined by said packet type determination circuit.

2. A stream converting apparatus for converting a first format data stream into a second format data stream, said first format data stream being obtained by packetizing a first level data stream to generate a second level data stream and further multiplexing said second level data stream, the apparatus comprising:

a stream extracting circuit extracting said second level data stream from said first format data stream;

an error detecting circuit connected to an output of said stream extracting circuit and detecting an error included in said second level data stream output from said stream extracting circuit;

a data correcting circuit connected to said error detecting circuit and correcting the error detected by said error detecting circuit to generate a proper-form second level data stream; and a multiplexer connected to an output of said data correcting circuit and multiplexing said second level data stream corrected by said data correcting circuit to generate said second format data stream;

wherein said second level data stream is arranged in packets including packet headers, and said packet header includes system clock information associated with data and synchronization information, and said error detecting circuit includes a separating circuit separating and extracting said second level data stream from said first format data stream and determining whether the synchronization information is missing to output a synchronization information error signal, and a clock error detecting circuit connected to said separating circuit and detecting the error included in said second level data stream based on a transition of said system clock information in the packet header of each packet in said second level data stream extracted by said separating circuit and said synchronization information error signal; and wherein said clock error detecting circuit includes a clock interval determining circuit determining the error by detecting that said system clock information included in the packet header of each packet in said second level data stream does not make a transition at a predetermined constant interval, and an error type determining circuit connected to said clock interval determining circuit and said separating circuit and determining which one of destruction of data including the system clock information and missing of the data the error included in said second level data stream corresponds to, based on the determination of said clock interval determining circuit and said synchronization information error signal.

3. The stream converting apparatus according to claim 2, wherein said data correcting circuit includes a packet correcting circuit connected to said error type determining circuit and, when the error type determined by said error type determining circuit is the destruction of data, correcting a content of the relevant packet, and a dummy data inserting circuit connected to said error type determining circuit and, when the error type determined by said error type determining circuit is the missing of data, generating and inserting into the data a dummy packet including dummy data in substitution for a missing packet.

4. A stream converting apparatus for converting a first format data stream into a second format data stream, said first format data stream being obtained by packetizing a first level data stream to generate a second level data stream and further multiplexing said second level data stream, the apparatus comprising:

a stream extracting circuit extracting said second level data stream from said first format data stream;

an error detecting circuit connected to an output of said stream extracting circuit and detecting an error included in said second level data stream output from said stream extracting circuit;

a data correcting circuit connected to said error detecting circuit and correcting the error detected by said error detecting circuit to generate a proper-form second level data stream; and a multiplexer connected to an output of said data correcting circuit and multiplexing said second level data stream corrected by said data correcting circuit to generate said second format data stream; and wherein said error detecting circuit includes a first separating circuit separating and extracting said second level data stream from said first format data stream and detecting a synchronization information error to output a first synchronization information error signal, a second separating circuit connected to said first separating circuit and separating and extracting said first level data stream from said second level data stream separated by said first separating circuit and detecting a synchronization information error of said first level data stream to output a second synchronization information error signal, and a circuit detecting the error using a packet header of a packet of said second level within said second level data stream separated by said first separating circuit, said first synchronization information error signal and said second synchronization information error signal.

5. A stream converting apparatus for converting a first format data stream into a second format data stream, said first format data stream being obtained by packetizing a first level data stream to generate a second level data stream and further multiplexing said second level data stream, the apparatus comprising:
  a stream extracting circuit extracting said second level data stream from said first format data stream;
  an error detecting circuit connected to an output of said stream extracting circuit and detecting an error included in said second level data stream output from said stream extracting circuit;
  a data correcting circuit connected to said error detecting circuit and correcting the error detected by said error detecting circuit to generate a proper-form second level data stream; and
  a multiplexer connected to an output of said data correcting circuit and multiplexing said second level data stream corrected by said data correcting circuit to generate said second format data stream; and wherein
  said error detecting circuit includes a separating circuit separating and extracting said second level data stream from said first format data stream and detecting a synchronization information error to output a first synchronization information error signal, and
  said data correcting circuit includes a circuit, responsive to said first synchronization information error signal, for generating and inserting in the data stream a dummy corresponding to a missing portion of the data.

6. A stream converting apparatus for converting a first format data stream into a second format data stream, said first format data stream being obtained by packetizing a first level data stream to generate a second level data stream and further multiplexing said second level data stream, the apparatus comprising:
  a stream extracting circuit extracting said second level data stream from said first format data stream;
  an error detecting circuit connected to an output of said stream extracting circuit and detecting an error included in said second level data stream output from said stream extracting circuit;
  a data correcting circuit connected to said error detecting circuit and correcting the error detected by said error detecting circuit to generate a proper-form second level data stream; and
  a multiplexer connected to an output of said data correcting circuit and multiplexing said second level data stream corrected by said data correcting circuit to generate said second format data stream;
  a second error detecting circuit extracting said first level data stream from said second level data stream extracted by said stream extracting circuit and detecting an error included in said first level data stream; and
  a second data correcting circuit connected to said second error detecting circuit and correcting said first level data stream in response to the detection of the error by said second error detecting circuit.

7. The stream converting apparatus according to claim 6, wherein
  said second error detecting circuit includes a data missing determining circuit determining whether missing of data has occurred based on synchronization information in said first level data stream, and
  said second error correcting circuit includes a circuit, responsive to the determination of said data missing determining circuit that the missing of data has occurred, for generating dummy data of said first level for insertion into said first level data stream.

8. The stream converting apparatus according to claim 7, wherein said dummy data includes one of data and a code that is preselected to alleviate an increase of a code amount.

9. A stream converting apparatus for converting a first format data stream into a second format data stream, said first format data stream being obtained by packetizing a first level data stream to generate a second level data stream and further multiplexing said second level data stream, the apparatus comprising:
  a stream extracting circuit extracting said second level data stream from said first format data stream;
  an error detecting circuit connected to an output of said stream extracting circuit and detecting an error included in said second level data stream output from said stream extracting circuit;
  a data correcting circuit connected to said error detecting circuit and correcting the error detected by said error detecting circuit to generate a proper-form second level data stream; and
  a multiplexer connected to an output of said data correcting circuit and multiplexing said second level data stream corrected by said data correcting circuit to generate said second format data stream;
  an input code amount detecting circuit detecting a code amount of said first format data stream being input; and
  a padding data inserting circuit inserting to an output of said multiplexer padding data of an amount corresponding to a difference between the code amount detected by said input code amount detecting circuit and a code amount output from said multiplexer.

* * * * *